United States Patent
Hull et al.

(10) Patent No.: US 10,401,252 B2
(45) Date of Patent: Sep. 3, 2019

(54) PNEUMATIC PLUG CLEAN-OUT TEES

(71) Applicant: OATEY CO., Cleveland, OH (US)

(72) Inventors: Eric G. Hull, Avon Lake, OH (US); Dennis R. Young, Sheffield Village, OH (US); Aaron Lorkowski, Fairview Park, OH (US); Paul R. Metcalfe, Solon, OH (US); Scott E. Urban, University Heights, OH (US)

(73) Assignee: OATEY CO., Cleveland, OH (US)

( * ) Notice: Subject to any disclaimer, the term of this patent is extended or adjusted under 35 U.S.C. 154(b) by 55 days.

(21) Appl. No.: 15/312,232

(22) PCT Filed: May 22, 2015

(86) PCT No.: PCT/US2015/032135
§ 371 (c)(1),
(2) Date: Nov. 18, 2016

(87) PCT Pub. No.: WO2016/028347
PCT Pub. Date: Feb. 25, 2016

(65) Prior Publication Data
US 2017/0089799 A1    Mar. 30, 2017

Related U.S. Application Data

(60) Provisional application No. 62/001,893, filed on May 22, 2014.

(51) Int. Cl.
*G01M 3/02* (2006.01)
*F16L 55/124* (2006.01)
*F16L 55/11* (2006.01)
*F16K 7/10* (2006.01)
*F16L 55/10* (2006.01)

(52) U.S. Cl.
CPC ............... *G01M 3/022* (2013.01); *F16K 7/10* (2013.01); *F16L 55/10* (2013.01); *F16L 55/11* (2013.01); *F16L 55/124* (2013.01)

(58) Field of Classification Search
CPC . G01M 3/022; F16K 7/10; F16L 55/10; F16L 55/11; F16L 55/124
USPC ........................................................ 73/49.1
See application file for complete search history.

(56) References Cited

U.S. PATENT DOCUMENTS

| | | | | |
|---|---|---|---|---|
| 3,902,528 A | * | 9/1975 | Tartabini | G01M 3/2853 138/90 |
| 4,122,869 A | * | 10/1978 | Roberson, Sr. | F16K 7/10 138/93 |
| 4,658,861 A | * | 4/1987 | Roberson, Sr. | F16L 55/124 138/90 |

(Continued)

*Primary Examiner* — Natalie Huls
*Assistant Examiner* — Monica S Young
(74) *Attorney, Agent, or Firm* — BakerHostetler

(57) ABSTRACT

A pneumatic test plug for clean-out tees and a method of testing a pipeline are disclosed. The pneumatic test plug includes a cap and a bladder. The cap has an inflation inlet and a testing fluid inlet. The testing fluid inlet provides a conduit for a testing fluid. The testing fluid may be a liquid or a gas. The bladder is in fluid connection with the inflation inlet. The bladder has an open end and a closed end. The open end receives air from the inflation inlet. The closed end is opposite the open end. The testing fluid inlet provides testing fluid through the cap and outside of the bladder. The inflation inlet provides a passageway to the bladder.

14 Claims, 27 Drawing Sheets

(56) References Cited

U.S. PATENT DOCUMENTS

| | | | | |
|---|---|---|---|---|
| 5,353,841 | A | * | 10/1994 | Mathison ............ F16L 55/1108 138/90 |
| 6,073,891 | A | | 6/2000 | Humber |
| 6,116,286 | A | * | 9/2000 | Hooper ................ F16L 55/115 138/90 |
| 7,513,274 | B1 | | 4/2009 | Glenn |
| 7,597,118 | B1 | * | 10/2009 | Peterson ............ F16L 55/1286 137/224 |
| 10,041,630 | B1 | * | 8/2018 | Huddleston ............... F17D 3/01 |
| 2004/0144439 | A1 | * | 7/2004 | Lundman ............. F16L 55/134 138/93 |
| 2005/0189027 | A1 | | 9/2005 | Markham |
| 2006/0027276 | A1 | | 2/2006 | Main |
| 2008/0163951 | A1 | | 7/2008 | Lundman |
| 2010/0037681 | A1 | * | 2/2010 | Hart ..................... G01M 3/022 73/40.5 R |
| 2015/0177092 | A1 | * | 6/2015 | Parker .................. G01M 3/022 73/40.7 |

* cited by examiner

PNEUMATIC PLUG CLEAN-OUT TEES

CROSS REFERENCE TO RELATED APPLICATIONS

This application is a National Stage Application, filed under 35 U.S.C. § 371, of International Application No. PCT/US2015/032135, filed May 22, 2015, which claims the benefit of and priority to U.S. Provisional Patent Application No. 62/001,893, filed on May 22, 2014, the entire contents of which are expressly incorporated herein by reference thereto.

FIELD OF THE INVENTION

This invention relates to a pneumatic test plug for testing and sealing clean out tees or access ports in pipelines and conduits.

BACKGROUND OF THE INVENTION

Clean-out tees are used in horizontally and vertically disposed conduits or pipelines which may require periodic entry for testing, cleaning, or inspection purposes. Clean-out tees or access ports to pipelines are typically found in drain pipes, such as those located in the main plumbing drain pipes in residential or commercial structures. Pneumatic clean-out plug devices permit a user to utilize a clean-out tee or access port and to seal the pipeline for purposes of testing the pipeline for leakage, pressure testing, or the like.

SUMMARY

The present application discloses exemplary embodiments of a pneumatic test plug for clean-out tees. In an embodiment, the pneumatic test plug includes a cap and a bladder. The cap has an inflation inlet and a testing fluid inlet. The testing fluid inlet provides a conduit for a testing fluid. The testing fluid may be a liquid or a gas. For example, the testing fluid may be water or another liquid or air or another gas. The bladder is in fluid connection with the inflation inlet. The bladder has an open end and a closed end. The open end receives an inflation fluid (such as air, or any other fluid) from the inflation inlet. The closed end is opposite the open end. The testing fluid inlet provides testing fluid through the cap and outside of the bladder. The inflation inlet provides a passageway to the bladder.

In another embodiment, a plumbing assembly includes a clean-out tee and a test plug. The clean-out tee has a first conduit portion, a second conduit portion, and a third conduit portion. The test plug is positioned in the first conduit portion. The test plug has a cap and a bladder. The cap has an inflation inlet providing a conduit for inflation fluid and a testing fluid inlet providing a conduit for a testing fluid. The bladder is in fluid connection with the inflation inlet. The bladder has an open end that receives the inflation fluid from the inflation inlet. The bladder has a closed end opposite the open end. The testing fluid inlet provides testing fluid through the cap and outside of the bladder. The testing fluid inlet provides testing fluid to the second conduit portion of the clean-out tee. The inflation inlet provides a passageway to the bladder. The bladder seals against an interior surface of the clean-out tee when the bladder is inflated to prevent the testing fluid from passing from the second conduit portion to the third conduit portion.

In another embodiment, the pneumatic test plug includes a cap, a retention collar, and a bladder. The cap has a testing fluid inlet, a first cylindrical wall, and an inflation inlet. The testing fluid inlet receives a testing fluid and the inflation inlet receives an inflation fluid. The first cylindrical wall has exteriorly disposed threads thereon. The retention collar has an upper portion connected to a lower portion. The lower portion includes a testing fluid outlet. The cap is seated on the lower portion. The testing fluid outlet and the testing fluid inlet are in fluid connection. The bladder is connected to the retention collar and is in fluid connection with the inflation inlet. The bladder has an open end sealed against the cap, a closed end opposite the open end, a side wall disposed between the open end and the closed end, and a first cleft in the side wall. The testing fluid outlet is at least partially disposed in the first cleft.

In another embodiment, the pneumatic test plug includes a testing fluid inlet for receiving a testing fluid through the pneumatic test plug and into a segment of a pipeline, a cap, a threaded collar connected to the cap, a retention collar, and a bladder. The cap has a first cylindrical wall and an inflation inlet for receiving an inflation fluid. The testing fluid inlet is located in the cap. The threaded collar has a second cylindrical wall with a diameter larger than a diameter of the first cylindrical wall. The threaded collar also has exteriorly disposed threads on the second cylindrical wall. The retention collar has an upper portion connected to a lower portion. The cap and the threaded collar engage the lower portion. The retention collar also has a testing fluid outlet in the lower portion. The testing fluid outlet and the testing fluid inlet are in fluid connection with the pipeline. The bladder is in fluid connection with the inflation inlet. The bladder has an open end, a closed end, a side wall, and a first cleft. The open end is seated on the upper portion of the retention collar. The closed end is opposite the open end. The side wall is disposed between the open end and the closed end. The first cleft is in the side wall. The testing fluid outlet is at least partially disposed in the first cleft.

In another embodiment, the pneumatic test plug for clean-out tees includes a cap, a threaded collar connected to the cap, a retention collar, and a bladder. The cap has a first cylindrical wall, an attachment feature, an inflation inlet, and a testing fluid inlet. The first cylindrical wall is connected to a lid. The attachment feature is on a first end of the first cylindrical wall. The first end is oppositely disposed from a second end. The inflation inlet is connected to the cap. The testing fluid inlet is connected to the lid. The threaded collar has a second cylindrical wall with an inner diameter larger than a diameter of the first cylindrical wall. The threaded collar has exteriorly disposed threads on the second cylindrical wall. The retention collar has an upper portion and a testing fluid outlet. The upper portion is connected to a lower portion. An outermost width of the upper portion is smaller than an outermost width of the lower portion. The cap and the threaded collar engage the lower portion. The testing fluid outlet is in the lower portion. The testing fluid outlet is in fluid connection with the testing fluid inlet. The attachment feature is placed within the testing fluid outlet. The bladder is in fluid connection with the inflation inlet. The bladder has an open end, a closed end opposite the open end, an inwardly converging side wall, and a first cleft in the inwardly converging side wall. The open end is seated on the upper portion of the retention collar. The open end has a peripheral ridge extending therefrom to aid in seating the bladder on the retention collar. The testing fluid outlet is positioned at least partially within the first cleft.

An exemplary embodiment of a method of testing a pipeline is also disclosed.

BRIEF DESCRIPTION OF THE DRAWINGS

The accompanying drawings incorporated herein and forming a part of the specification, illustrate several embodiments of the present invention and together with the description serve to explain certain principles of the invention.

DETAILED DESCRIPTION

Prior to discussing the various embodiments, a review of the definitions of some exemplary terms used throughout the disclosure is appropriate. Both singular and plural forms of all terms fall within each meaning:

"Connecting" and "securing" as used herein, includes but is not limited to affixing, joining, attaching, fixing, fastening, placing in contact two or more components, elements, assemblies, portions or parts. Connecting or securing two or more components, etc., can be direct or indirect such as through the use of one or more intermediary components and may be intermittent or continuous.

In the embodiments discussed herein, the pneumatic test plug for clean-out tees, the plumbing assembly, and the method of testing a pipeline are described for use in a vertically oriented clean-out tee. However, the pneumatic test plug for clean-out tees, the plumbing assembly, and the method of testing a pipeline of the present application may be used with a variety of other types of pipelines and plumbing or piping systems. For example, the pneumatic test plug for clean-out tees, the plumbing assembly, and the method of testing a pipeline described herein are equally applicable to horizontally oriented plumbing systems, tubing, and the like.

Figure 1:
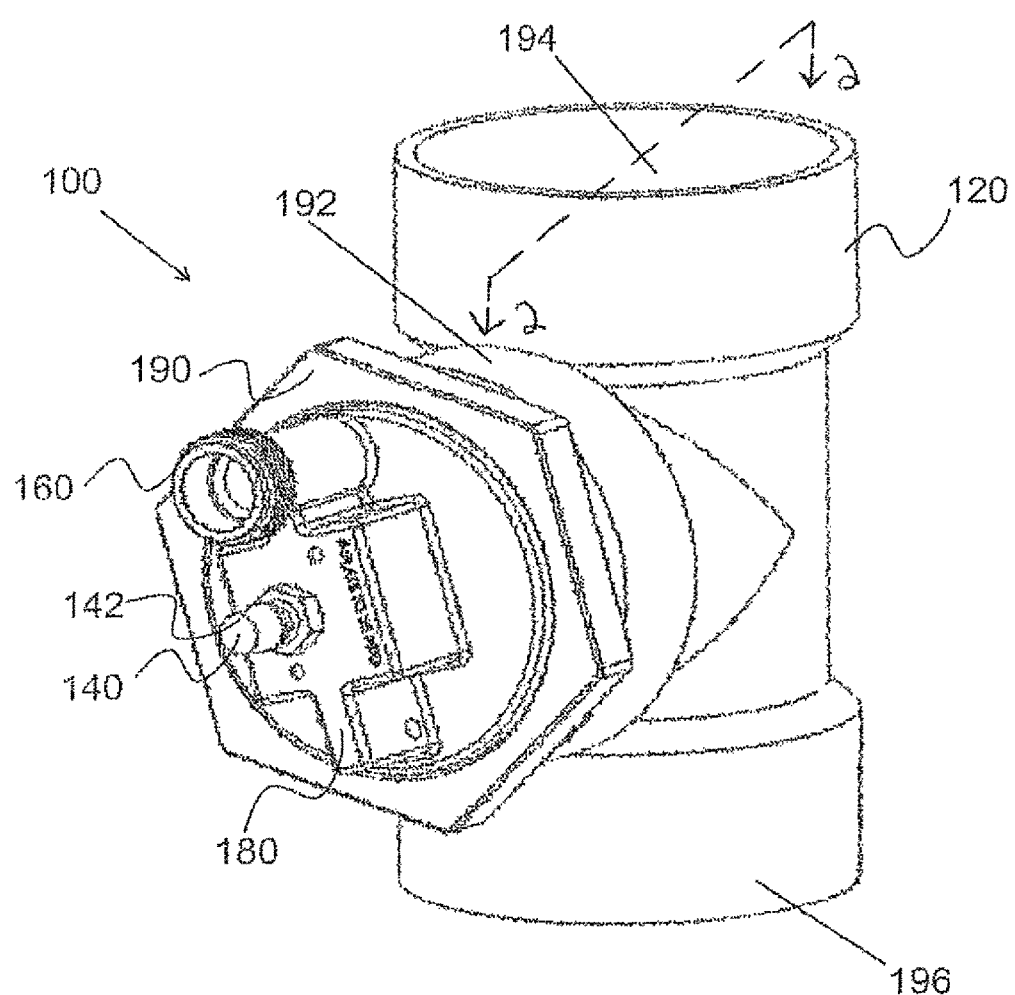
FIG. 1 is a perspective view of an exemplary embodiment of a plumbing assembly.

In accordance with one general embodiment, the plumbing assembly includes a clean-out tee 120, and a test plug 100 as illustrated in FIG. 1. In the illustrated embodiment, the clean-out tee 120 has a first conduit portion 192, a second conduit portion 194, a third conduit portion 196. The test plug 100 is seated in the clean-out tee 120. The test plug 100 is positioned in the first conduit portion 192. The second conduit portion 194 and the third conduit portion 196 are configured to connect to piping. A testing fluid inlet 160 is in fluid connection with the second conduit portion 194.

Figure 4:
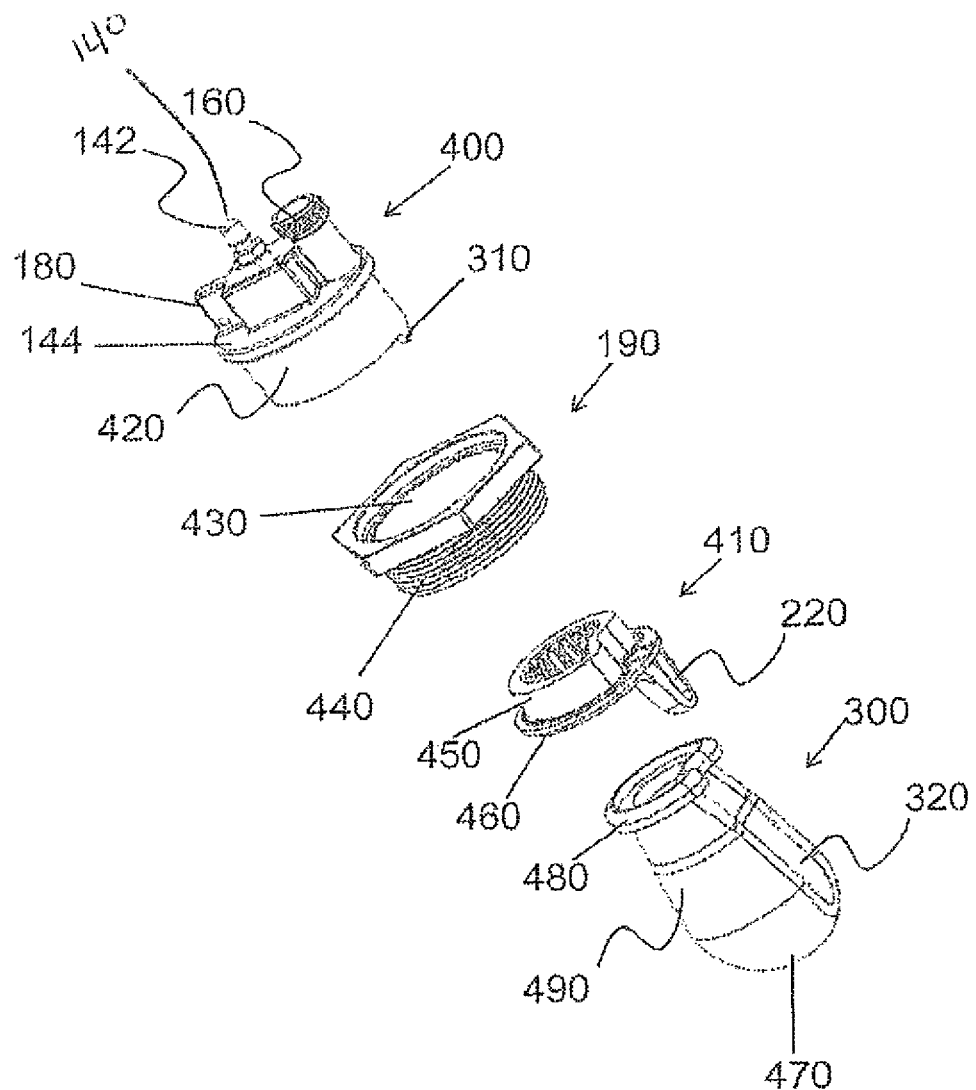
FIG. 4 is a perspective assembly view of an exemplary embodiment of a pneumatic test plug.
Figure 5:
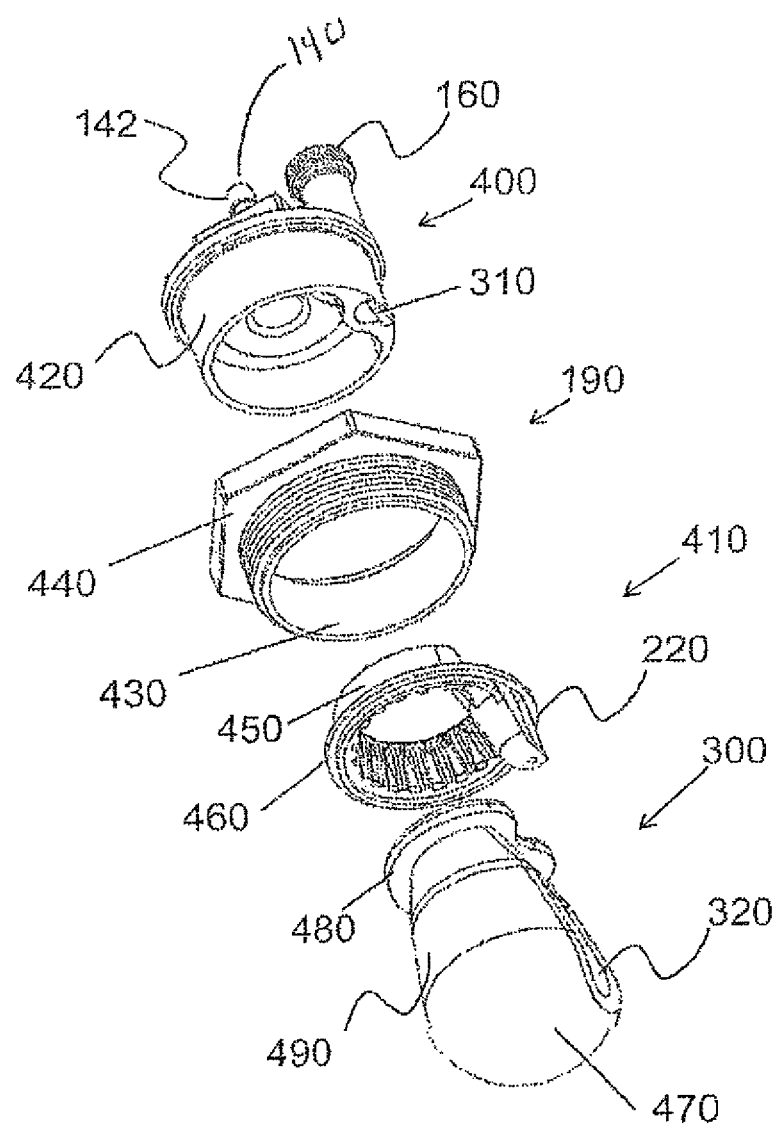
FIG. 5 is a perspective assembly view of an exemplary embodiment of a pneumatic test plug.

In one exemplary embodiment shown in FIGS. 4 and 5, the pneumatic test plug 100 for a clean-out tee 120 includes a cap 400 and a bladder 300. The cap has an inflation inlet 140 and a testing fluid inlet 160. The testing fluid inlet 160 provides a conduit for a testing fluid 1600. The bladder 300 is in fluid connection with the inflation inlet 140, which provides a conduit for inflation fluid 1560. The bladder 300 has an open end 1300 and a closed end 470. The open end 1300 receives the inflation fluid 1560 (such as air, or any other fluid) from the inflation inlet 140. The closed end 470 is opposite the open end 1300. The testing fluid inlet 160 provides testing fluid 1600 through the cap 400 and outside of the bladder 300. The inflation inlet 140 provides a passageway to the bladder 300.

Figure 6:
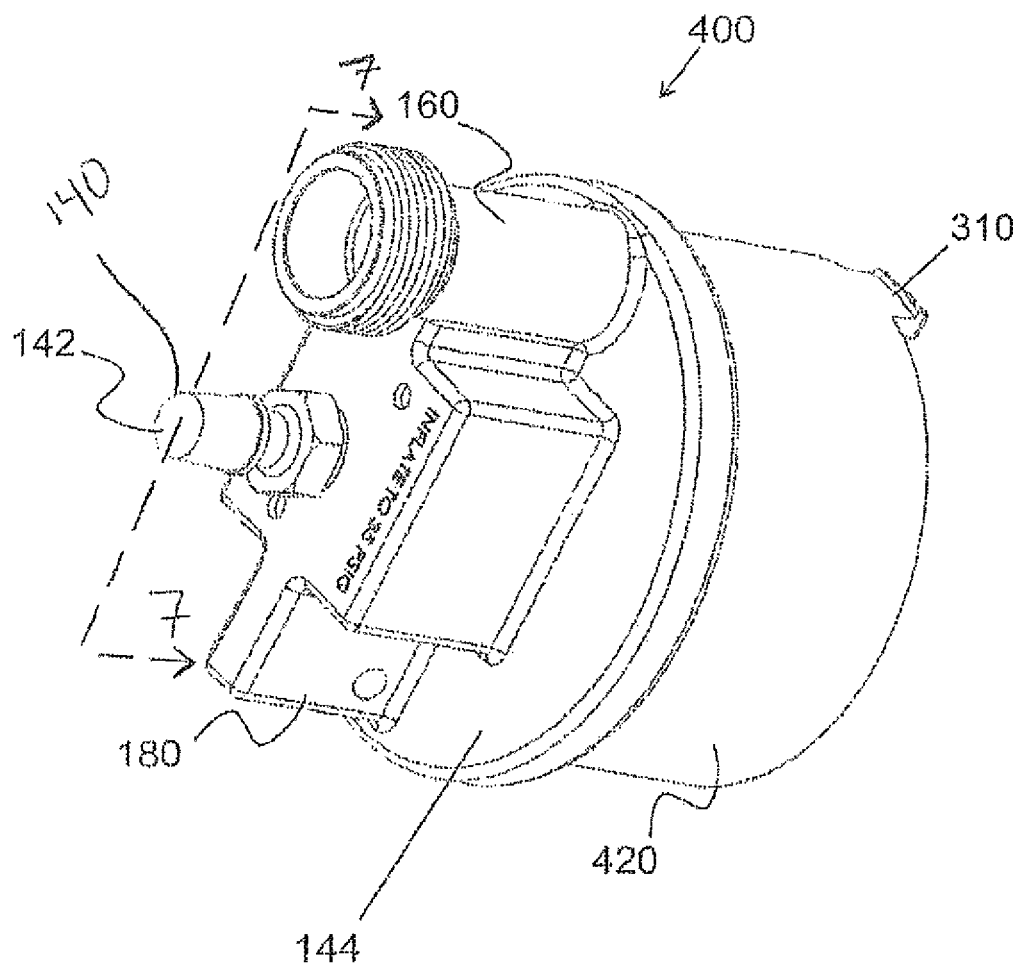
FIG. 6 is a perspective view of an exemplary embodiment of a cap.
Figure 7:
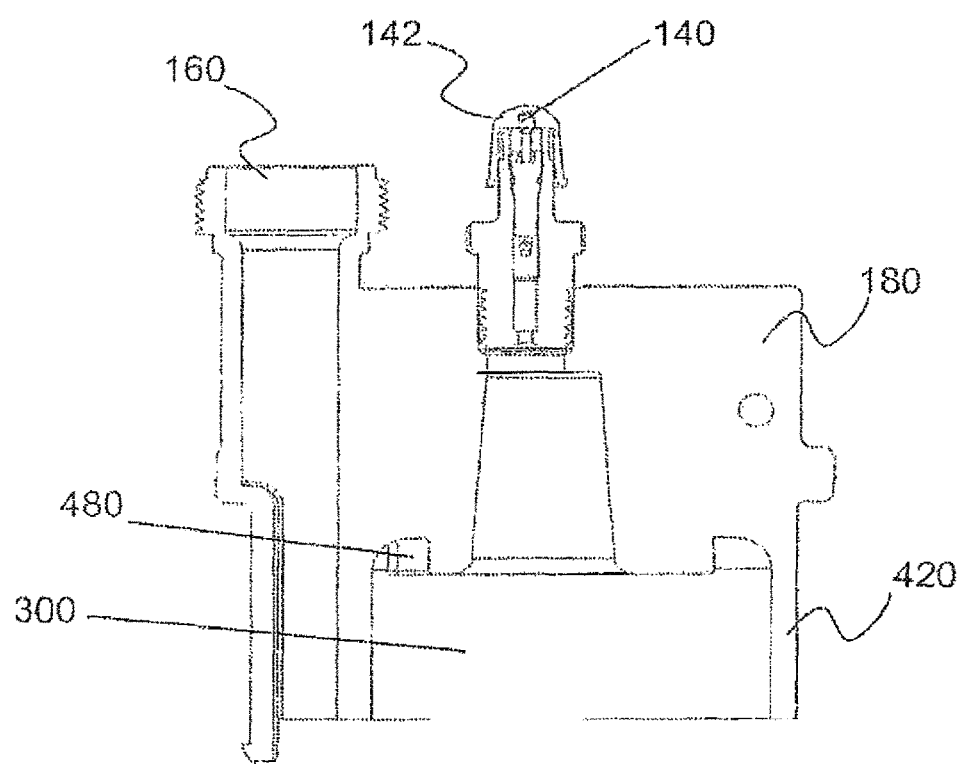
FIG. 7 is a schematic sectional view of the cap illustrated by FIG. 6, taken along the plane indicated by lines 7-7 in FIG. 6.

The cap 400 can take a wide variety of different forms. For example, the cap 400 may comprise a single piece or multiple pieces. In the examples illustrated by FIGS. 4 and 5, the cap 400 comprises several members assembled together. The cap 400 may have any form that provides an inflation inlet 140 and a testing fluid inlet 160. In the embodiment illustrated by FIG. 6, the cap 400 has a first cylindrical wall 420. In one exemplary embodiment, the first cylindrical wall has exteriorly disposed threads thereon (not shown). Thus, the cap 400 may have exteriorly exposed threads for securing the cap 400 to the first conduit 192 in the clean-out tee 120. However, in the embodiment illustrated by FIGS. 4-6, the exteriorly disposed threads are on a threaded collar 190. The inflation inlet 140 may be connected to the first cylindrical wall 420. In one exemplary embodiment, the cap 400 has an attachment feature 310 on a first end of the first cylindrical wall. The first end of the first cylindrical wall is oppositely disposed from a second end of the first cylindrical wall. In one exemplary embodiment, the cap 400 may have a lid 144 connected to first cylindrical wall 420. In one exemplary embodiment, the testing fluid inlet 160 is connected to a lid 144. In the exemplary embodiment illustrated in FIG. 6, the cap 400 further has at least one thumb wing 180.

As shown in FIGS. 4 and 5, the inflation inlet 140 is connected to the cap 400. The inflation inlet 140 provides a passageway to the bladder 300. The inflation inlet 140 may take a wide variety of different forms. In one exemplary embodiment, the inflation inlet 140 is configured to receive the inflation fluid 1560. Although in an exemplary embodiment, the inflation inlet 140 may receive air, it should be understood that the inflation inlet 150 may likewise be configured to receive any fluid, including without limitation, other types of gas or liquid. The inflation inlet 140 may have any configuration, so long as the inflation inlet 140 is in fluid connection with the bladder 300.

Figure 16:
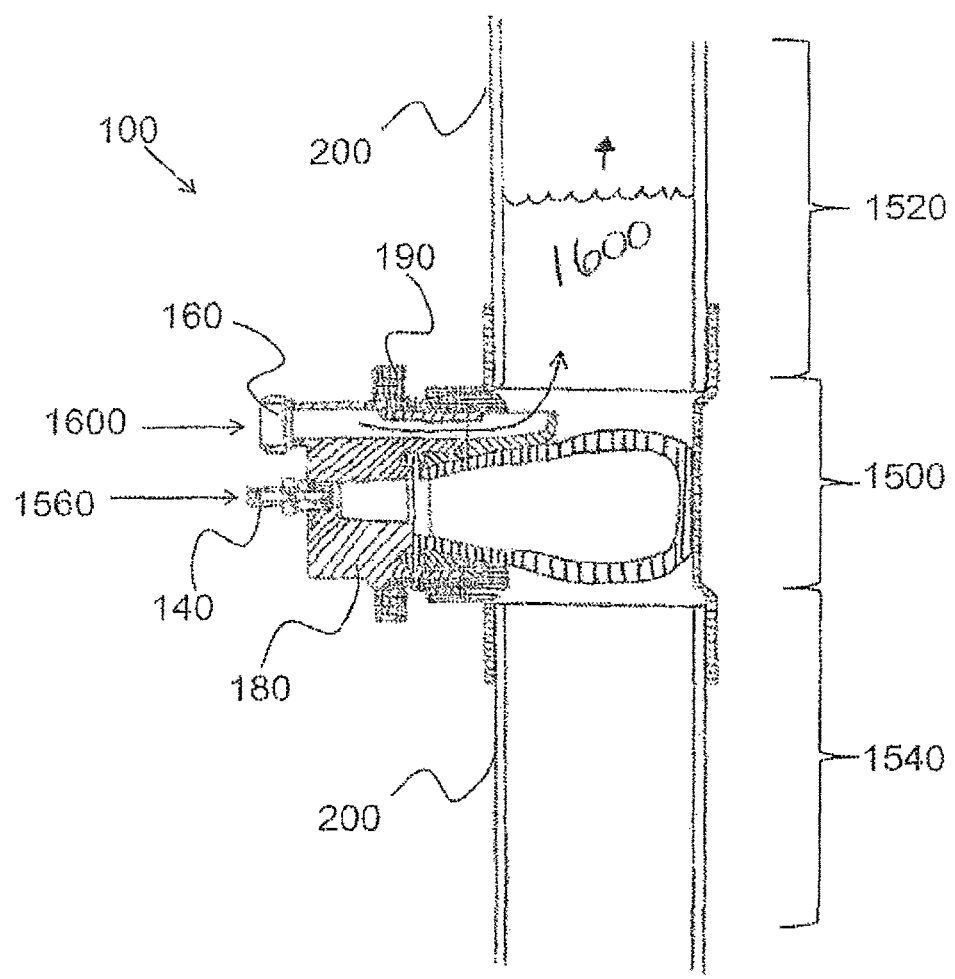
FIG. 16 is a schematic sectional view of an exemplary embodiment of a plumbing assembly with a testing fluid in the pipeline.

The testing fluid inlet 160 receives a testing fluid 1600 (see FIG. 16). The testing fluid inlet 160 is used to provide testing fluid 1600 to a second conduit portion 194 of the clean-out tee 120. The testing fluid inlet 160 may take a wide variety of different forms, so long as the testing fluid inlet 160 provides a conduit for receiving a testing fluid 1600. In the embodiment illustrated in FIG. 4 and FIG. 6, the testing fluid inlet 160 is connected to a lid 144. The testing fluid inlet 160 provides testing fluid 1600 through the cap 400 and outside of the bladder 300. The testing fluid 1600 may be a wide variety of different substances. For example, the testing fluid 1600 may be water, any other liquid, a gel, a gas or any flowing substance.

Figure 2:
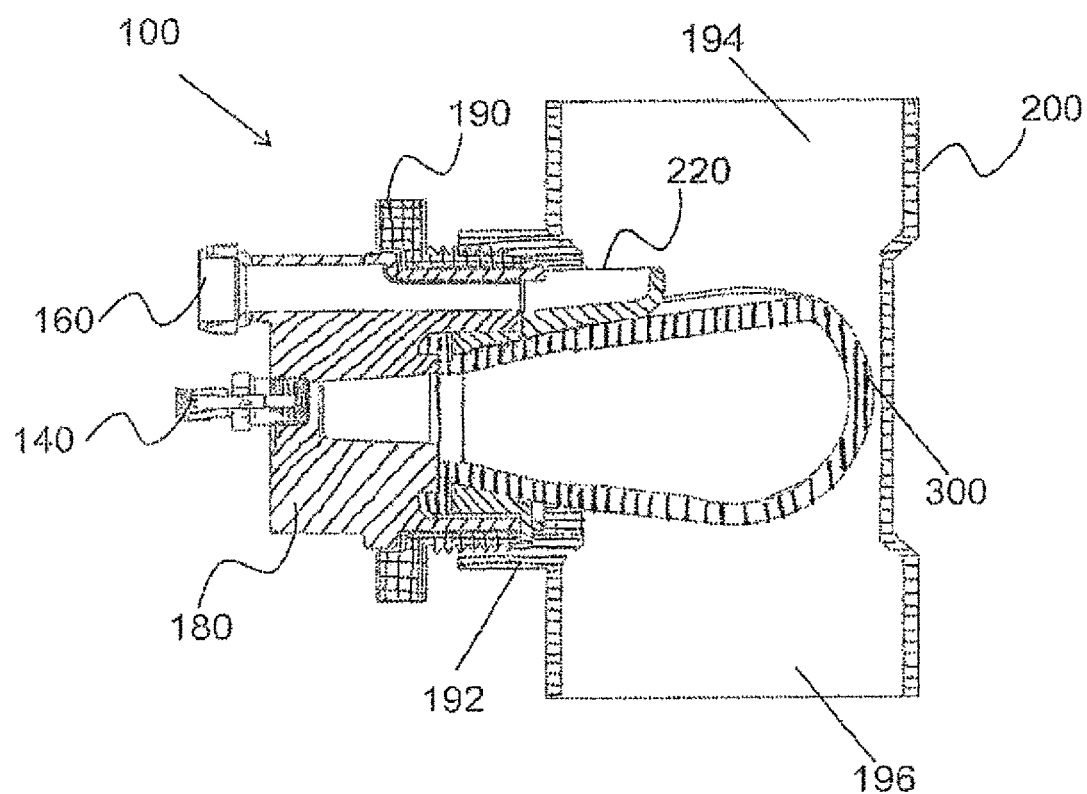
FIG. 2 is a schematic sectional view of the plumbing assembly illustrated by FIG. 1, taken along the plane indicated by lines 2-2 in FIG. 1.
Figure 13:
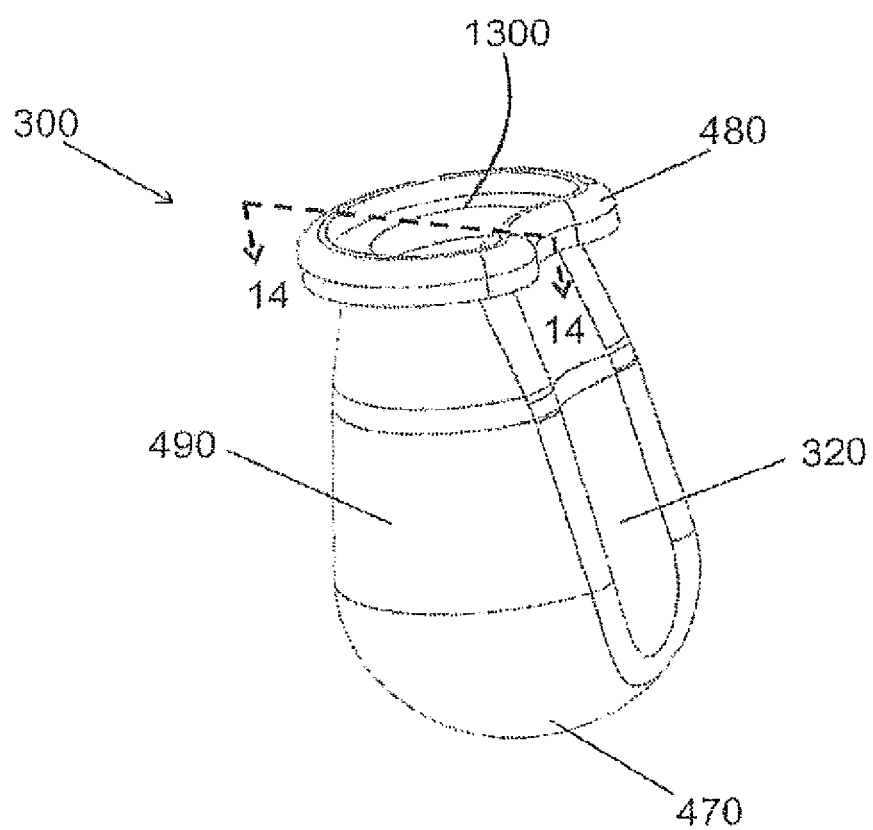
FIG. 13 is a perspective view of an exemplary embodiment of a bladder.
Figure 14:
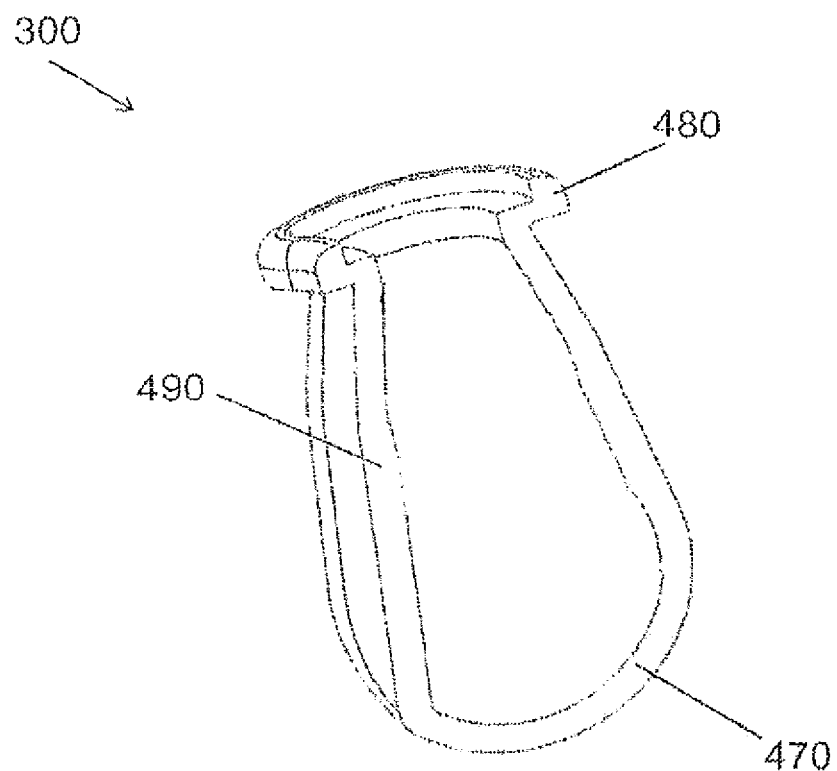
FIG. 14 is a sectional perspective view of an exemplary embodiment of the bladder, taken along the plane indicated by lines 14-14 in FIG. 13.

The bladder 300 is in fluid connection with the inflation inlet 140 as illustrated in FIG. 2. The bladder 300 has an open end 1300 and a closed end as illustrated in FIG. 13. The bladder 300 may take a wide variety of different forms, so long as the bladder 300 seals against an interior surface of the clean-out tee 120. When the bladder 300 is inflated, it prevents the testing fluid 1600 from passing from the second conduit portion 194 to the third conduit portion 196. The bladder 300 may take any form that allows the open end 1300 to receive the inflation fluid 1560 from the inflation inlet 140. In one exemplary embodiment, the open end 1300 of the bladder 300 is sealed against the cap 400.

In the exemplary embodiment illustrated in FIG. 13, the closed end 470 may be opposite the open end 1300. The bladder 300 has a side wall 490 disposed between the open end 1300 and the closed end 470. The bladder 300 may have an inwardly converging side wall 490. Additionally, the bladder 300 may have a first cleft 320 in the side wall 490.

As illustrated in FIG. 13, the first cleft 320 may be in the inwardly converging side wall 490. In one exemplary embodiment, the testing fluid outlet 220 is positioned at least partially within the first cleft 320 (see FIG. 3).

Figure 8:
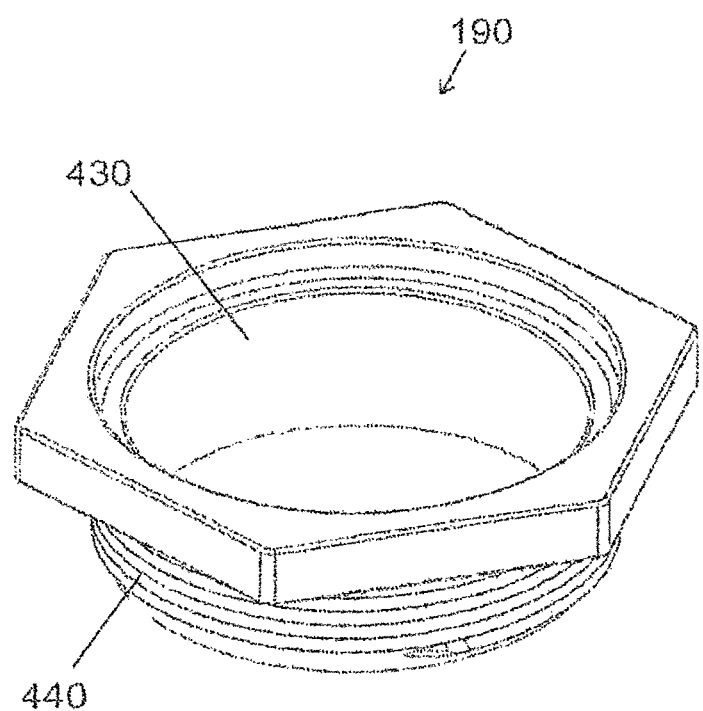
FIG. 8 is a perspective view of an exemplary embodiment of a threaded collar.

In one exemplary embodiment, the pneumatic test plug further includes an optional threaded collar 190 connected to the cap in addition to the cap and the bladder. In the example illustrated in FIG. 8, the threaded collar 190 has exteriorly disposed threads 440 on a second cylindrical wall 430 of the threaded collar 190. The second cylindrical wall 430 of the threaded collar 190 may have a diameter larger than a diameter of the first cylindrical wall 420. In one exemplary embodiment, the cap 400 and the threaded collar 190 engage the lower portion 460 of the retention collar 410.

Figure 9:
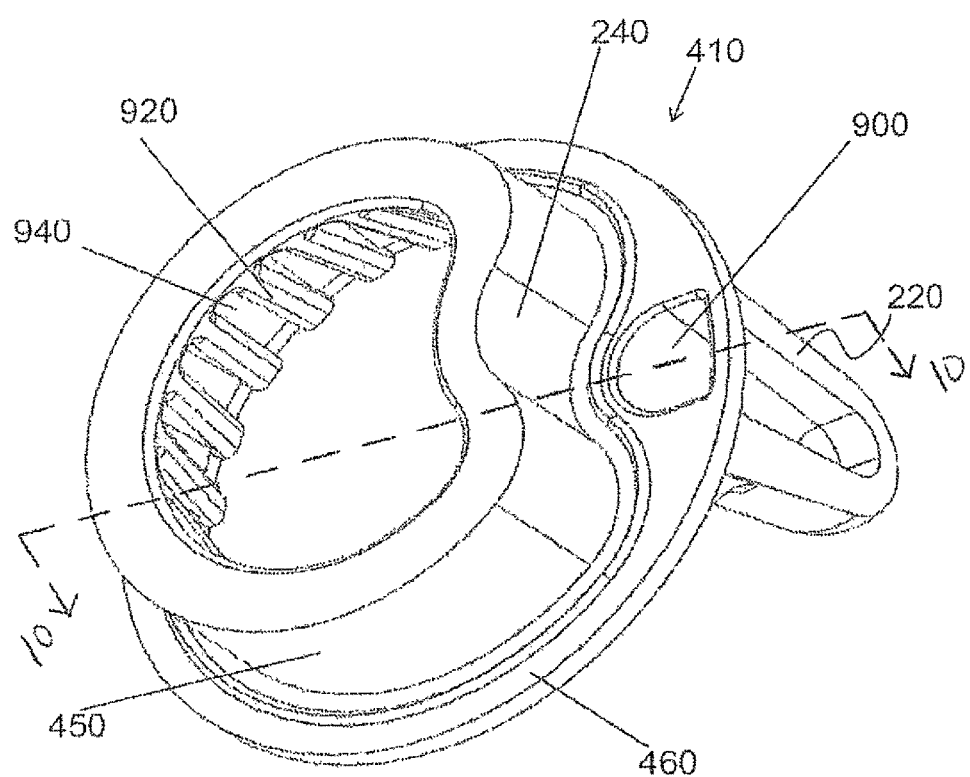
FIG. 9 is a perspective view of an exemplary embodiment of a retention collar.
Figure 10:
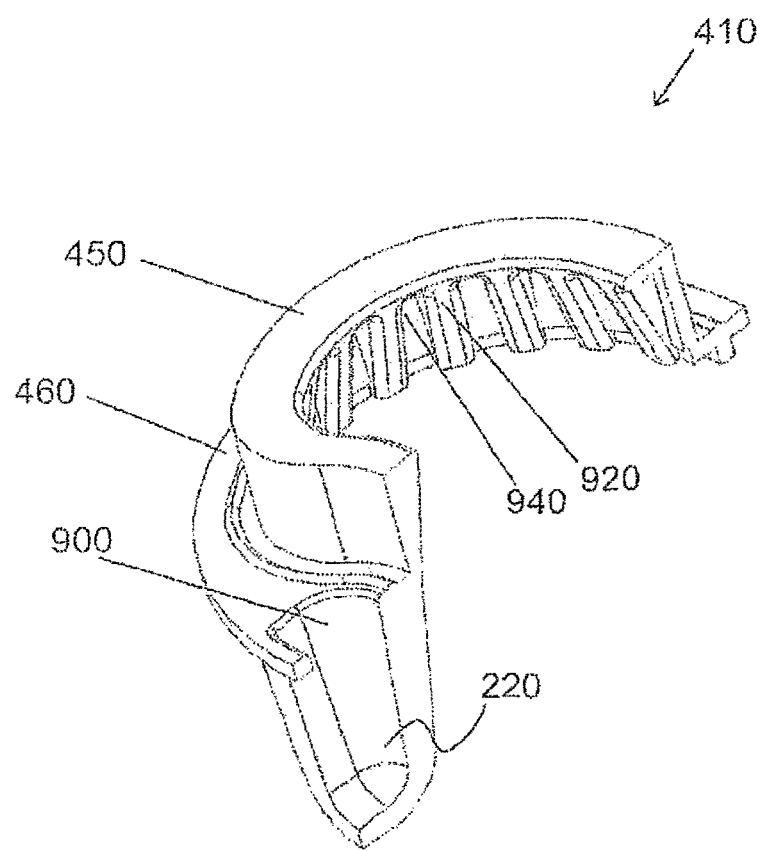
FIG. 10 is a perspective sectional view of an exemplary embodiment of the retention collar, illustrated by FIG. 9, taken along the plane indicated by lines 10-10 of FIG. 9.

Referring now to FIG. 9, in one exemplary embodiment, the pneumatic test plug 100 further includes an optional retention collar 410, in addition to the cap 400 and the bladder 300. In the example illustrated in FIG. 3, the retention collar 410 is connected to the cap 400 and the bladder 300. The retention collar has an upper portion 450 connected to a lower portion 460. An outermost width of the upper portion 450 is smaller than an outermost width of the lower portion 460. The cap 400 and the threaded collar 190 engage the lower portion 460. The lower portion 460 includes a testing fluid outlet 220. In one exemplary embodiment, the cap 400 is seated on the lower portion 460. The testing fluid outlet 220 and the testing fluid inlet 160 are in fluid connection with one another. Additionally, the testing fluid outlet 220 and the testing fluid inlet 160 are in fluid connection with a pipeline 200 that is in fluid communication with the clean-out tee 120.

Figure 3:
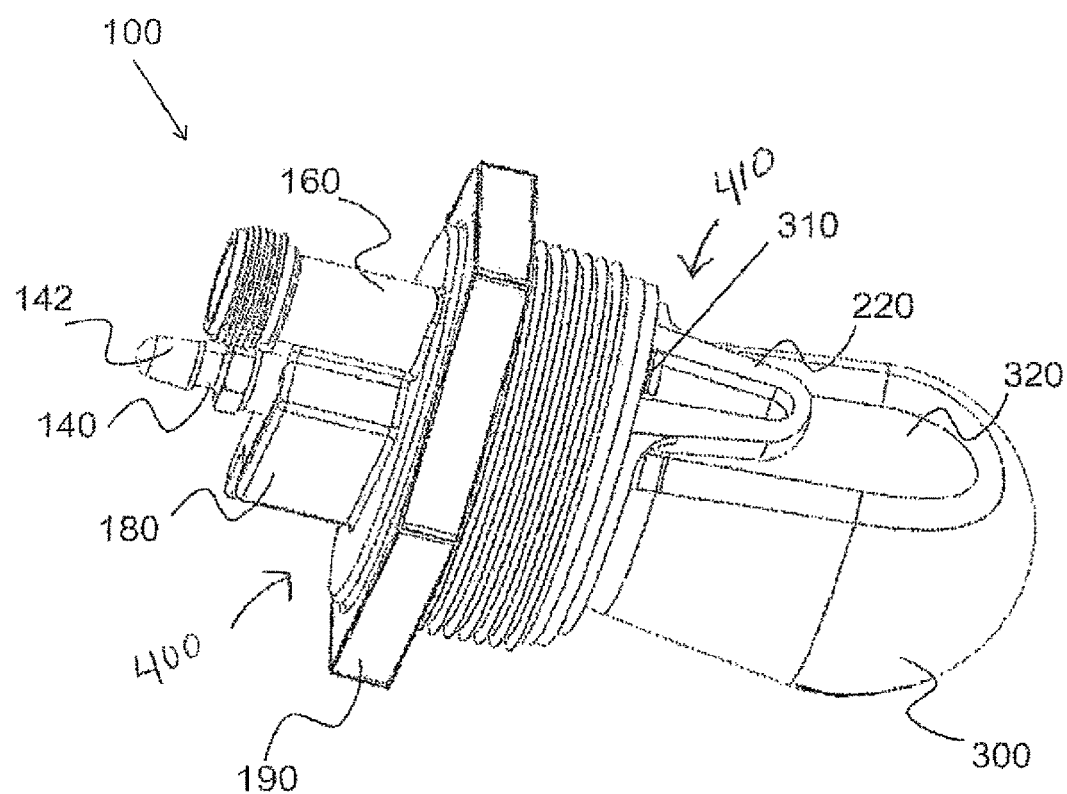
FIG. 3 is a perspective view of an exemplary embodiment of a pneumatic test plug.
Figure 11:
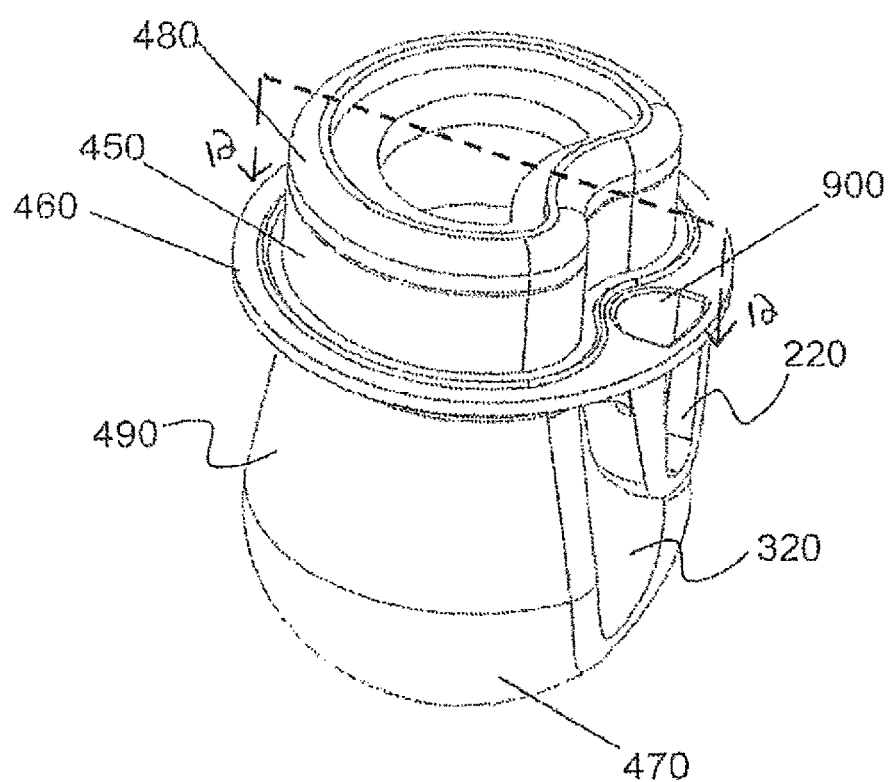
FIG. 11 is a perspective view of an exemplary embodiment of a bladder and a retention collar.
Figure 12:
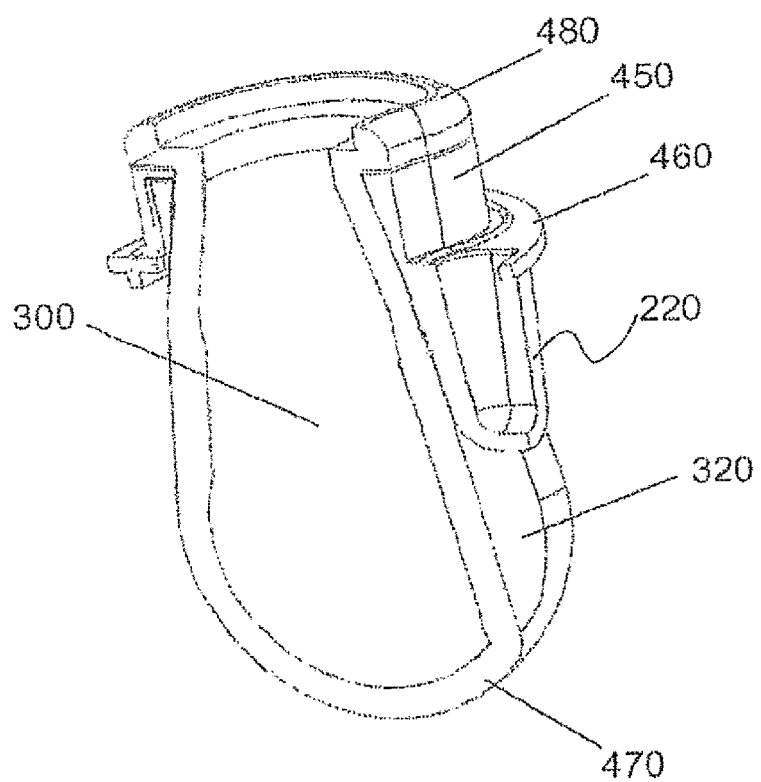
FIG. 12 is a sectional perspective view of an exemplary embodiment of the bladder and the retention collar, taken along the plane indicated by lines 12-12 in FIG. 11.

In the example illustrated in FIG. 11, the bladder 300 is connected to the retention collar 410. The open end 1300 of the bladder 300 is seated on the upper portion 450 of the retention collar 410. In the illustrated embodiment, the open end 1300 has a peripheral ridge 480 extending from it to aid in seating the bladder 300 on the retention collar 410. In one exemplary embodiment, the cap 400 further comprises an attachment feature 310 connected to the retention collar 410. In an exemplary embodiment, the attachment feature 310 is placed within the testing fluid outlet 220, as illustrated in FIG. 3. However, the attachment feature 310 may be connected to the retention collar 410 in a wide variety of different ways. Additionally, the attachment feature 310 may be placed in the pneumatic test plug 100 in a wide variety of different ways to secure the cap 400 to the bladder 300. In the illustrated embodiment of FIG. 9, the retention collar 410 has a second cleft 240 in the upper portion 450. In one exemplary embodiment, the second cleft 240 is in fluid connection with the testing fluid inlet 160.

Figure 15:
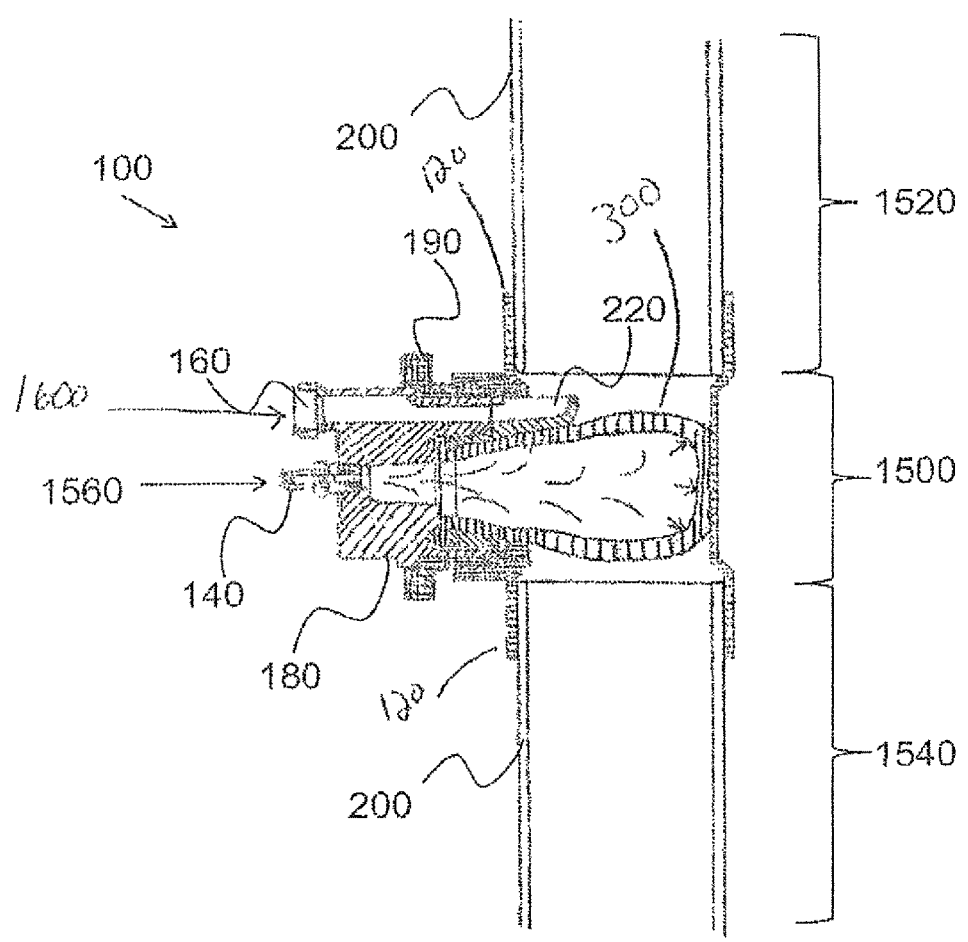
FIG. 15 is a schematic sectional view of an exemplary embodiment of a plumbing assembly with an inflated bladder.
Figure 17:
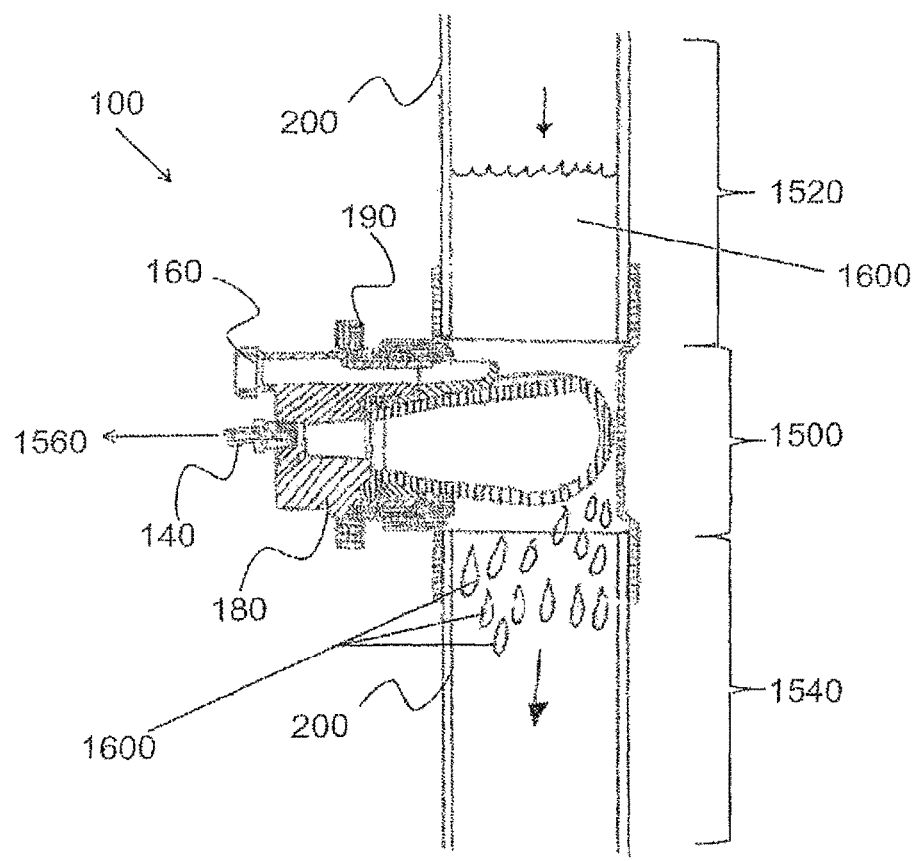
FIG. 17 is a schematic sectional view of an exemplary embodiment of a plumbing assembly with a partially deflated bladder.

FIGS. 15-17 illustrate an exemplary embodiment of a method of testing a pipeline 200. Referring to FIG. 15, a clean-out tee 120 having a pneumatic test plug 100 is connected to the pipeline 200. The pneumatic test plug 100 has a testing fluid inlet 160 for receiving a testing fluid 1600. The pneumatic test plug 100 may be connected to the pipeline 200 in a wide variety of different ways, so long as the testing fluid inlet 160 is in fluid connection with the pipeline 200. For example, pneumatic test plug 100 may be connected by screwing, welding, or the like. A bladder 300 in the pneumatic test plug 100 is inflated with the inflation fluid 1560 until the bladder 300 contacts and seals against a portion of the clean-out tee 120.

Referring to FIG. 16, the testing fluid 1600 is added to the testing fluid inlet 160 until an upstream segment 1520 of the pipeline 200 contains a desired amount of testing fluid 1600. The segment of the pipeline receiving the testing fluid is the upstream segment 1520 of the pipeline 200, which is upstream from the pneumatic test plug 100. The desired amount of testing fluid 1600 is any amount adequate to perform the specific test desired. The test is then performed. Examples of tests that may be performed include without limitation a pressure test and a leakage test. In one exemplary embodiment, the testing fluid 1600 may be added to the testing fluid inlet 160 for the purpose of cleaning or inspection of the pipeline 200 or a conduit.

Referring to FIG. 17, the bladder is at least partially deflated by removing inflation fluid 1560 from the bladder 300, which allows the testing fluid 1600 to travel to a downstream segment 1540 of the pipeline 200 past the bladder 300. In one exemplary embodiment, the pneumatic test plug 100 has a cap 400 connected to the testing fluid inlet 160. Additionally, the cap 400 has a first cylindrical wall 420 and wherein the inflation inlet 140 is connected to the first cylindrical wall 420. In one exemplary embodiment, the pneumatic test plug 100 has a retention collar 410 and a testing fluid outlet 220 in the retention collar 410. The testing fluid outlet 220 and the testing fluid inlet 160 are in fluid connection with the pipeline 200.

Figure 18:
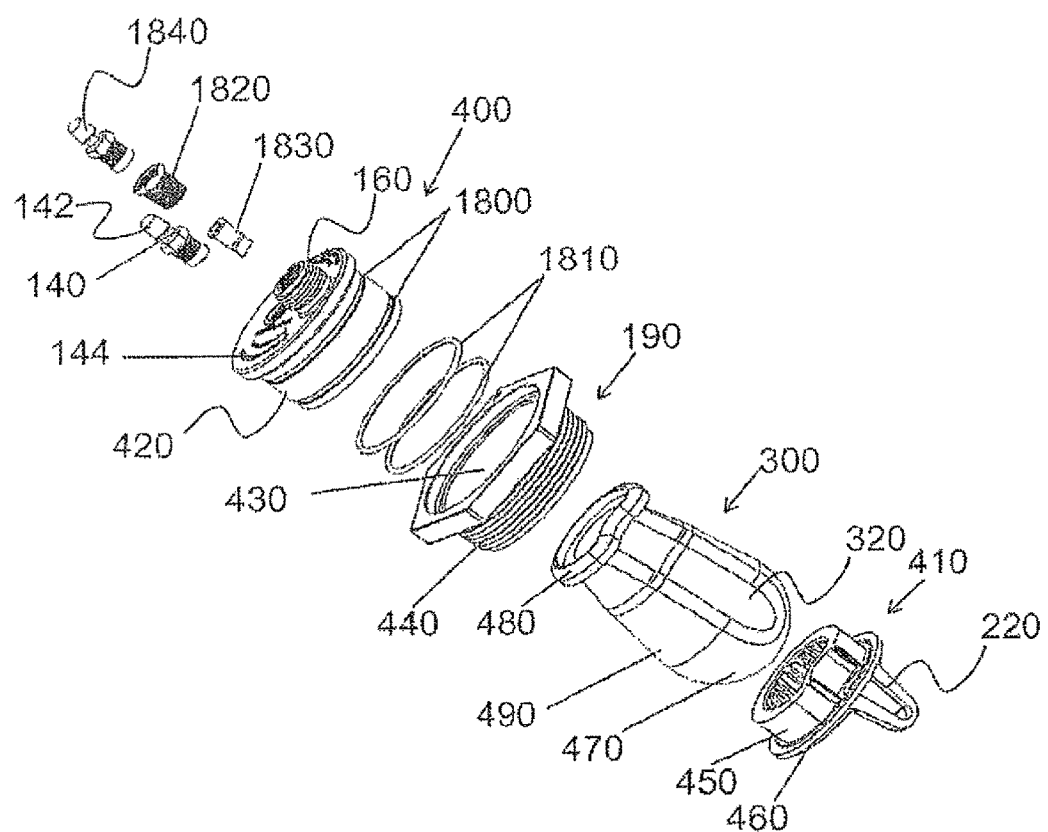
FIG. 18 is an exploded perspective assembly view of an exemplary embodiment of a pneumatic test plug.
Figure 19:
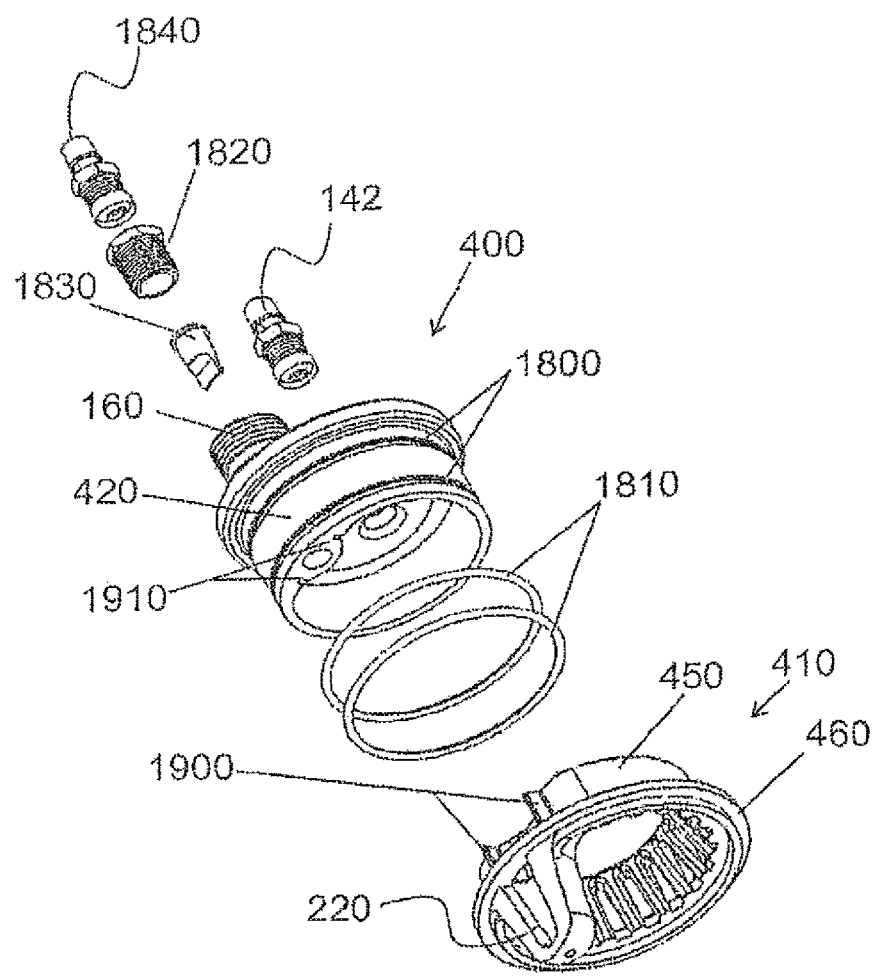
FIG. 19 is an exploded perspective assembly view of components of the pneumatic test plug illustrated by FIG. 18.
Figure 20:
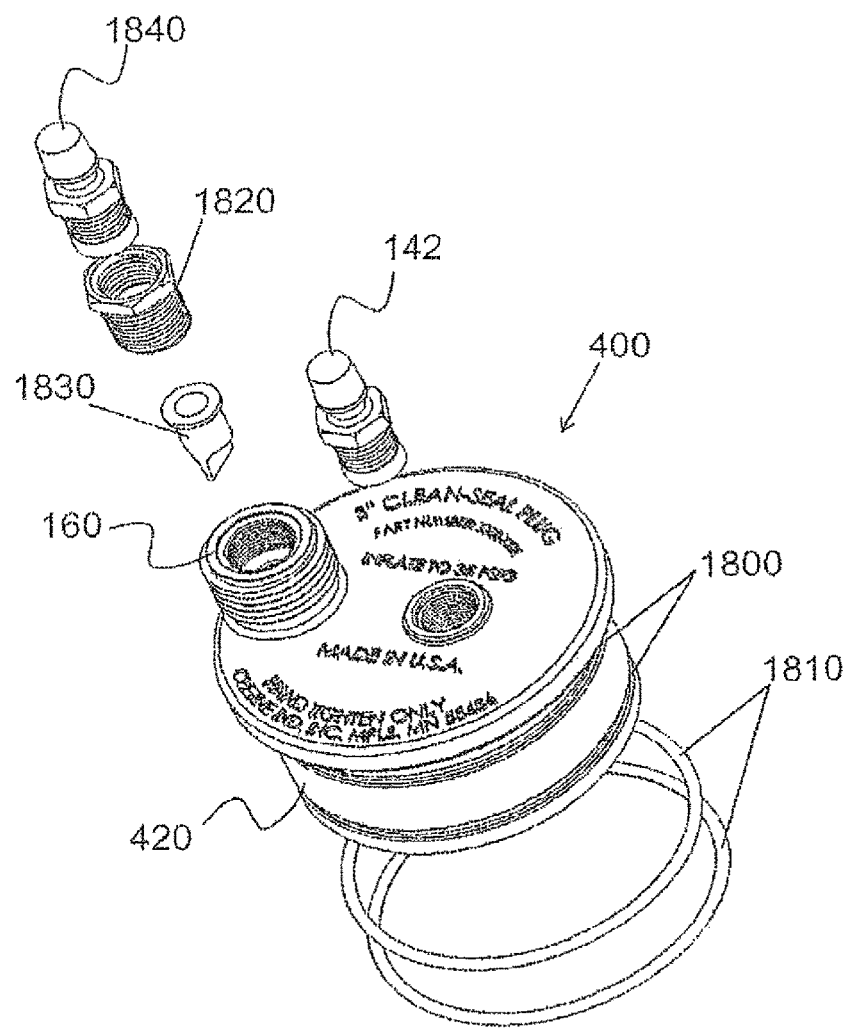
FIG. 20 is an exploded perspective assembly view of an exemplary embodiment of a cap.
Figure 21:
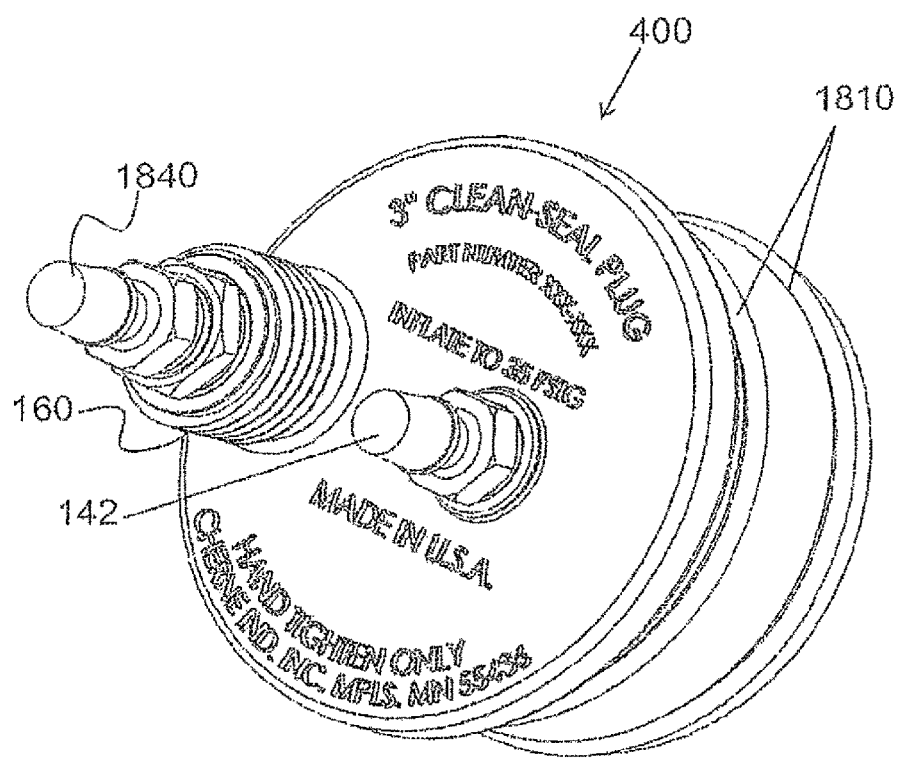
FIG. 21 is a perspective view of an exemplary embodiment of a cap.
Figure 22:
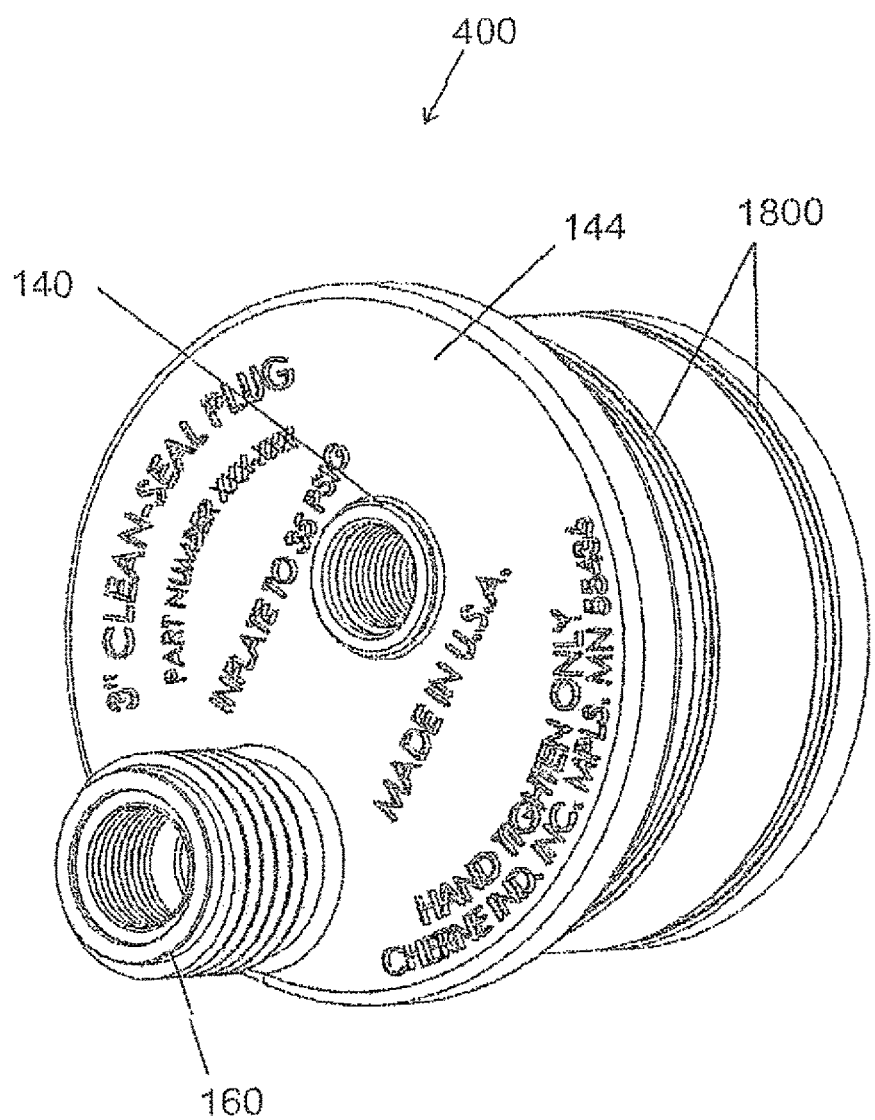
FIG. 22 is a perspective view of an exemplary embodiment of a cap.
Figure 23:
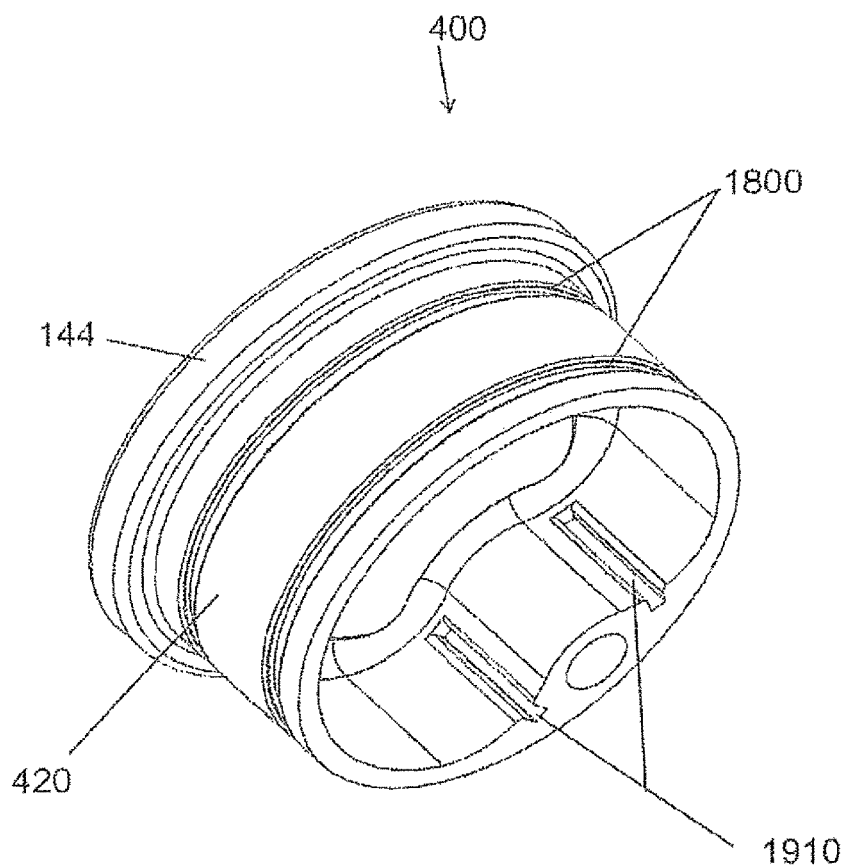
FIG. 23 is a perspective view of an exemplary embodiment of a cap.
Figure 24:
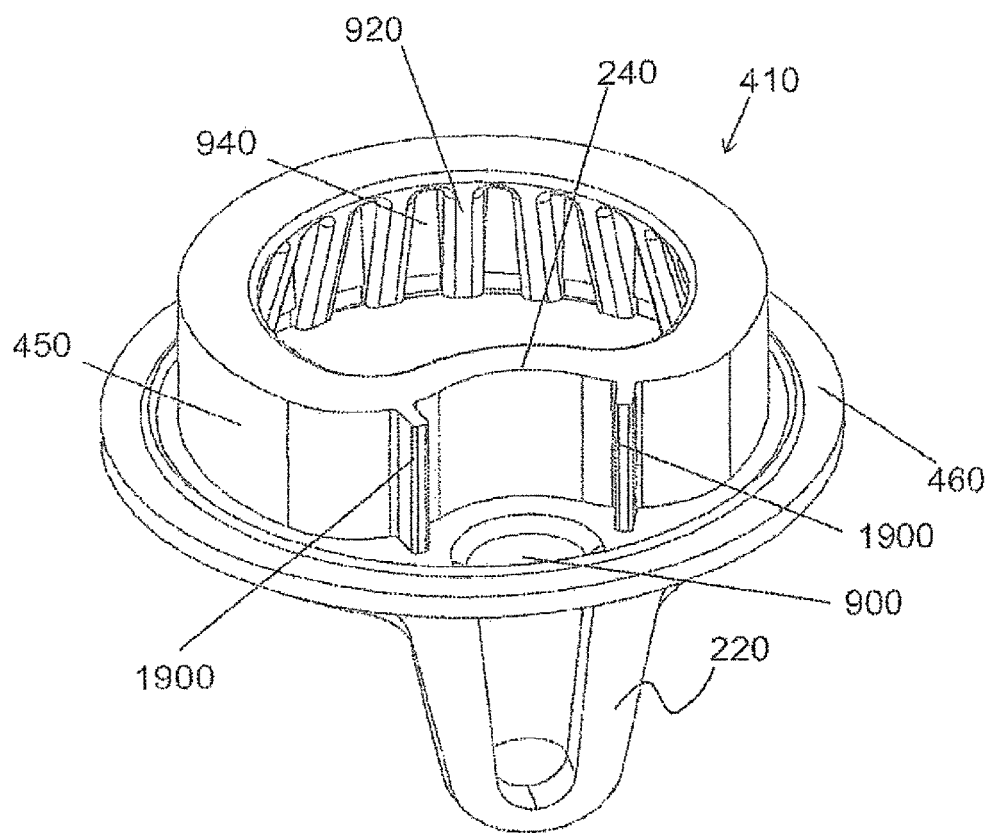
FIG. 24 is a perspective view of an exemplary embodiment of a retention collar.

Referring now to FIG. 18, in one exemplary embodiment, the testing fluid inlet 160 further includes an optional check valve 1830. The check valve 1830 can take a wide variety of different forms. Any check valve can be used. In the illustrated embodiment, the check valve is a reed type or "duckbill" type check valve. In other embodiments, the check valve 1830 may be a spring loaded check valve or other type of check valve. In the illustrated embodiment, the check valve 1830 is positioned inside a reducer 1820 that threads into the testing fluid inlet 160. In the illustrated exemplary embodiment, a testing fluid inlet fitting 1840 threads into the reducer 1820 to secure the check valve in place. In the illustrated embodiment, the cap 400 further includes at least one o-ring 1810 seated in at least one o-ring groove 1800 located on the first cylindrical wall 420. Referring now to FIGS. 19 and 24, the retention collar 410 includes at least one collar guide 1900 seated in at least one guide receptor 1910. The collar guide 1900 and the guide receptor position the retention collar 410 with respect to the cap 400.

In operation, it is advantageous that the test plug 100 forms a seal with the first conduit portion 192 of the clean-out tee 120, as shown in FIG. 1. Ordinarily, the test plug 100 attaches to the first conduit portion 192 via a threaded engagement (although other types of attachment are contemplated) and thereby abuts an edge 121 (FIGS. 25 and 26) of the clean-out tee 120 at the first conduit portion 192. Ideally, the edge 121 is square with (i.e., perpendicular to) the first conduit portion 192 such that the test plug 100, once attached, forms a seal against the edge 121. However, the seal may be compromised when, for example, the edge 121 is not square with the first conduit portion 192. In such a situation, a rigid embodiment of a test plug 100 might fail to seal against the edge 121, resulting in alignment issues and the possible leaking of testing fluid. One of skill in the art may appreciate this problem to be more common with clean-out tees 120 that are made from cast iron or polyvinylchloride (PVC), although this problem could occur in clean-out tees 120 made of any material known in the art.

Figure 25:
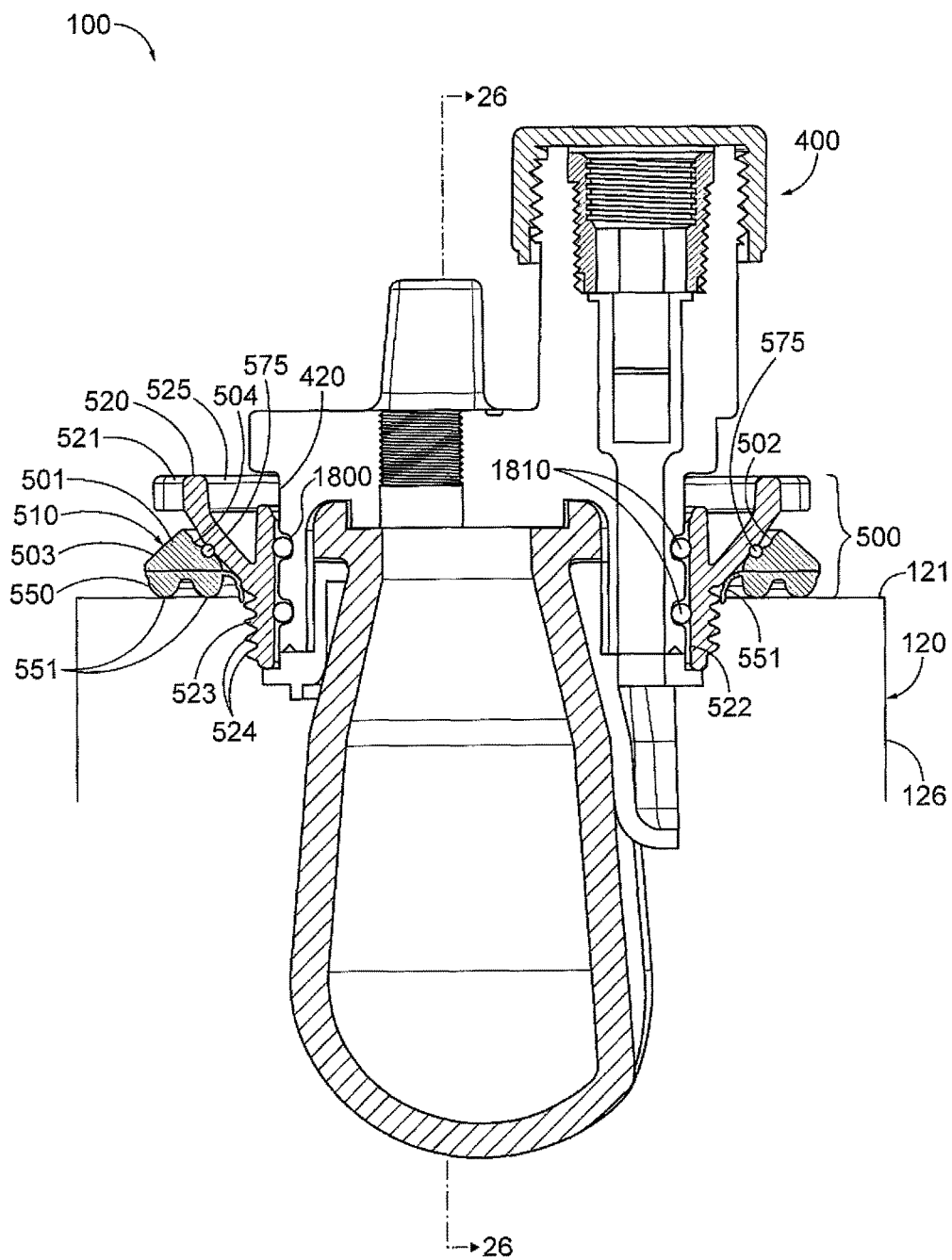
FIG. 25 is a side sectional view of an exemplary embodiment of a pneumatic test plug situated in a clean out tee, the test plug further including a sealing mechanism.
Figure 26:
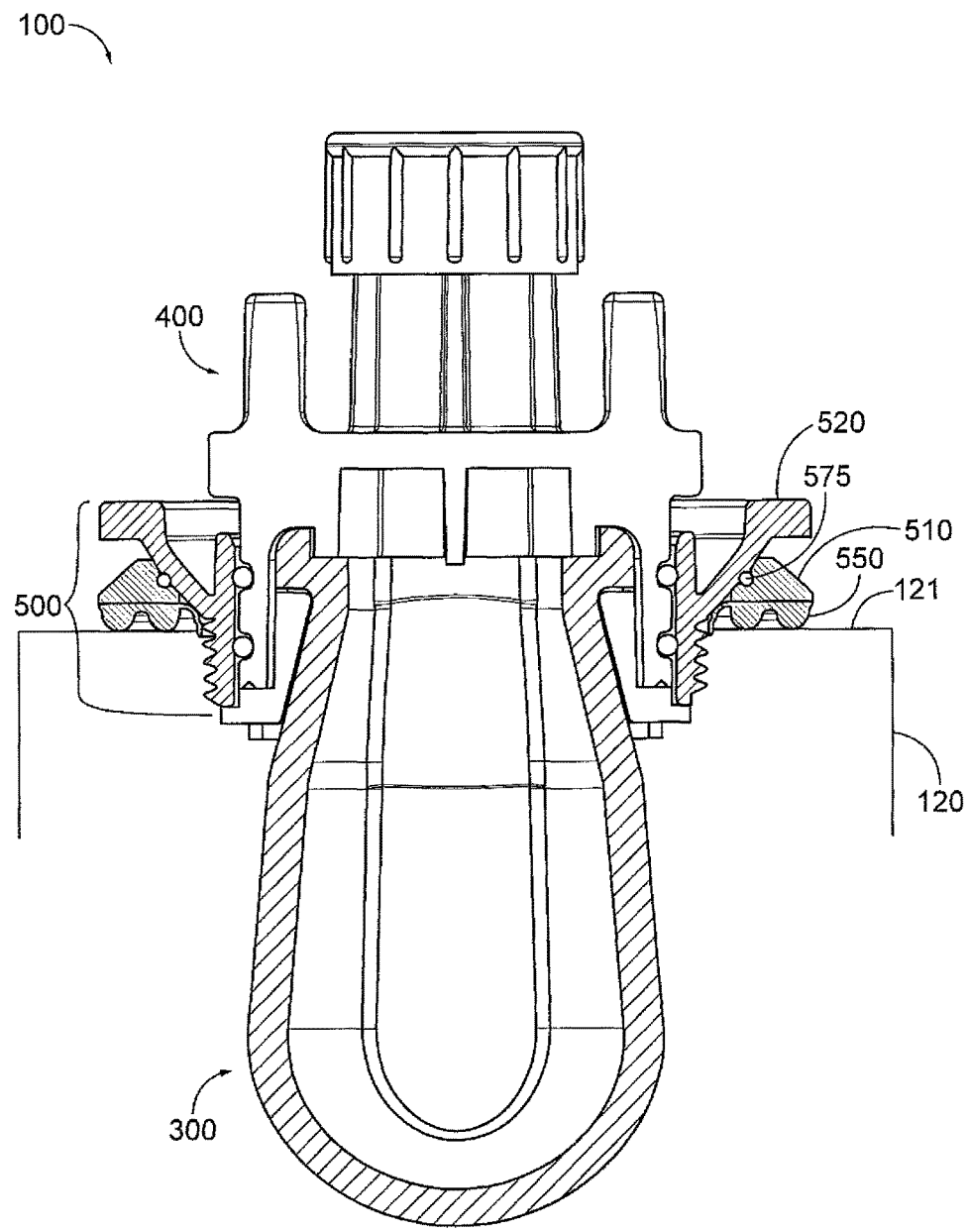
FIG. 26 is a side sectional view of the embodiment illustrated in FIG. 25 rotated 90 degrees about an axis indicated by the lines 26-26 in FIG. 25.
Figure 27:
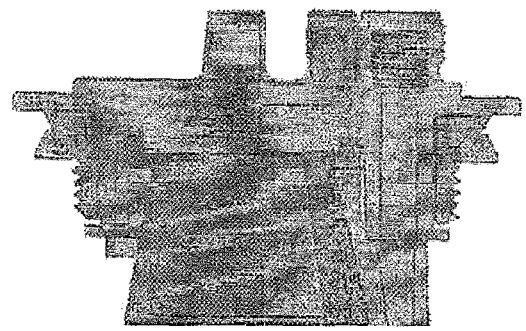
FIG. 27 is a side sectional view of an exemplary embodiment of a test plug further including a sealing mechanism, the sealing mechanism not including upper and lower seals.

In an embodiment shown in FIGS. 25-26, the test plug 100 may further include a sealing mechanism 500, which enables the test plug 100 to form a seal with the clean-out tee 120 when the edge 121 is not square with the first conduit portion 192. The sealing mechanism 500 generally comprises a seal carrier ring 510, a rounded collar 520, a lower seal 550, and an upper seal 575. In operation, the seal carrier ring 510 is capable of orientating with respect to the rounded collar 520 during installation of the test plug 100 into the first conduit portion 192 in order to provide the seal, as will be described in greater detail below.

Figure 28A:
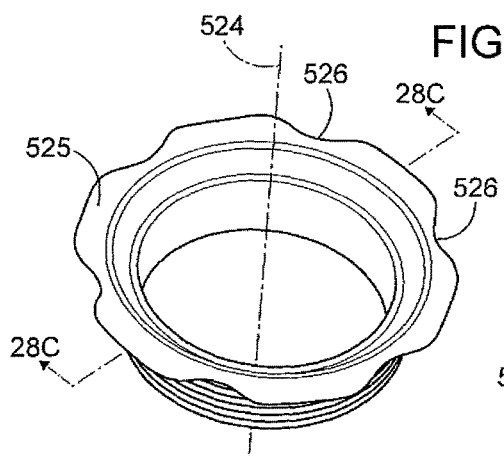
FIG. 28A is a perspective view of an embodiment of a sealing mechanism not including upper and lower seals.
Figure 28B:
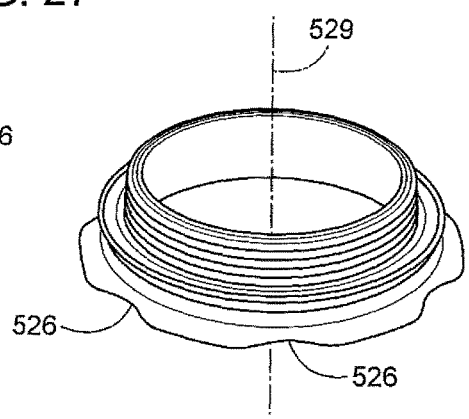
FIG. 28B is a perspective view of the sealing mechanism illustrated by FIG. 28A.
Figure 28C:
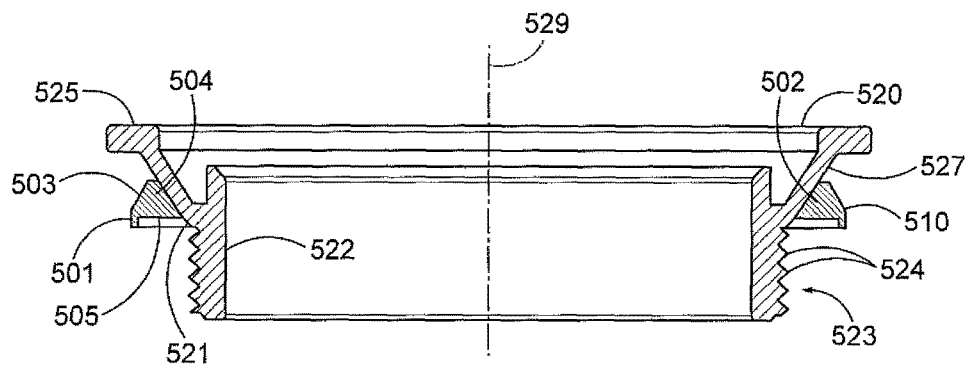
FIG. 28C is a side sectional view of the sealing mechanism illustrated by FIG. 28A, taken along the plane indicated by lines 28C-28C in FIG. 28A.

With reference to FIGS. 25 and 28C, the seal carrier ring 510 has a generally cylindrical body 501 defining an inner surface 502 for engaging the rounded collar 520 and an opposed outer surface 503. The inner surface 502 further includes a circumferential recess 504 for receiving upper seal 575 (FIG. 25). The body 501 further defines a bottom surface 505 (FIG. 28C) for receiving the lower seal 550 (FIG. 25). In an installed configuration illustrated in FIGS. 25 and 26, the lower seal 550 is configured to sit on at least the bottom surface 505 of the seal carrier ring 510. The lower seal 550 is configured to directly abut the edge 121 of the clean-out tee 120 in order to form a seal therewith. The lower seal 550 may comprise one or more circumferential, concentric lobes 551 which extend about a periphery of the lower seal 550. In operation, the one or more lobes 551 may increase the sealing capability of the lower seal 550 by, for example, increasing the available surface area of the lower seal 550 for mating with the edge 121 of the clean-out tee 120. The lower seal 550 may also further comprise an extension strip 552 disposed on an inner portion of the lower seal 550. In operation, the extension strip 551 may engage a portion of the rounded collar 520 so as to retain the lower seal 550 (and thereby the seal carrier ring 510) against the rounded collar 520. The lower seal 550 may be provided as a separate detachable component, or it may alternatively be overmolded on top of the seal carrier ring 510. The upper seal 575 may be formed as a generally circular ring and may be disposed in the circumferential recess 504 of the body 501. The upper seal 575 is useful for maintaining a liquid-proof seal between, for example, the seal carrier ring 510 and the rounded collar 520. The upper seal 575 may further be useful for containing the pressure exerted on the test plug 100 in operation (as shown in FIG. 17) that results, for example, from the collection of testing fluid 1600 that has been injected into the upstream segment 1520 of the pipeline 200. In an embodiment, the lower and upper seals 550, 575 are formed of a soft, flexible, rubber-type material which has water-proof qualities. For example the seals 550, 575 may be formed of nitrile rubber.

With continuing reference to FIGS. 25 and 28C, the rounded collar 520 has a generally cylindrical body 521, defining an inner portion 522 and an opposed outer engagement portion 523. The outer engagement portion may further comprise an engagement feature, such as threads 524, for engaging a complementary engagement feature of the clean-out tee 120. The body 521 further includes a cap portion 525 which, as illustrated in FIGS. 28A-B, may comprise a hexagonal (hex) pattern for mating with a wrench. The cap portion 525 may also comprise indents 526 which may enable a user to grasp the cap portion 525 with the user's hand(s). The rounded collar 520 is configured to be rotated about a central axis 529 (as illustrated in FIGS. 28A-28C) so as to cause the outer engagement portion 523—as illustrated, the threads 524—to engage the first conduit portion 192, thereby driving the bladder 300 (FIGS. 25 and 26) of the test plug 100 into the clean-out tee 120. With reference now to FIGS. 25 and 28C, the body 521 further defines a tapered surface 527 disposed between the cap portion 525 and the outer engagement portion 523. In the illustrated embodiment, the tapered surface 527 may be spherically shaped. In other embodiments not shown, the tapered surface 527 may alternatively be parabolic or planar. The tapered surface 527 is sized and shaped to mate with the seal carrier ring 510, such that in operation, the seal carrier ring 510 may orientate with respect to the rounded collar 520 by, for example, rotating and translating about the tapered surface 527. Such rotation and translation will enable the seal carrier ring 510 to orient itself so as to abut the edge 121 of the clean-out tee 120 when the edge 121 is not square with (i.e., perpendicular to) the first conduit portion 192. As illustrated in FIG. 25, the cap 400 further includes at least one o-ring 1810 seated in at least one o-ring groove 1800 located on the first cylindrical wall 420 of the cap 400. In the illustrated embodiment, the at least one o-ring 1810 may abut the inner surface 522 of the body 521 so as to cause the rounded collar 520 to form a seal with the cap 400.

It is contemplated that the test plug 100 will be provided with the sealing mechanism 500 prior to operation by the user. In that manner, the threaded collar 190 (illustrated in FIG. 8) may be replaced by the rounded collar 520 as described above, and it will be pre-installed onto the cap 400 of the test plug 100. Alternatively, the sealing mechanism 500 may be provided as a separate component than the test plug 100 such that a user will need to install the sealing mechanism 500 onto the test plug 100 prior to use. In other embodiments, the upper and lower seals 575, 550 of the sealing mechanism 500 may be removable or may come uninstalled from the sealing mechanism 500. Alternatively, the upper and lower seals 575, 550 may be pre-installed for the user on the sealing mechanism 500.

In an embodiment, a test plug 100 will comprise a sealing mechanism 500. The sealing mechanism 500 further comprises a seal carrier ring 510 and a rounded collar 520 that are moveable (i.e., orientatable) relative to one another. The seal carrier ring 510 has a generally cylindrical body 501 that defines opposed inner and outer surfaces 502, 503. The inner surface 502 is configured to abut a tapered surface 527 of the rounded collar 520 so as to permit the seal carrier ring 510 to rotate and translate relative to the rounded collar 520. The sealing mechanism 500 further includes a lower seal 550 which is configured to sit on a bottom surface 505 of the seal carrier ring 510; the seal carrier ring 510 being further configured to create a seal against an edge 121 of a clean-out tee 120 when the lower seal 550 is in an installed configuration (i.e., disposed on at least the lower surface 505 of the seal carrier ring 510). The rounded collar 520 has a generally cylindrical body 521 that defines an outer engagement portion 523 which is configured to engage a complementary feature of the clean-out tee 120. The rounded collar 520 also includes a cap portion 525 which facilitates rotational motion of the rounded collar 520 about a central axis 529. The cap portion 525 may also include indents 526 to facilitate rotation about central axis 529 by a user's hand without the use of a plumbing tool.

In operation, a user will insert the bladder 300 of the test plug 100 into the first conduit portion 192 of the clean-out tee 120. The user will then engage the outer engagement portion 523 of the rounded collar 520 with the complementary engagement feature of the clean-out tee 120. In the embodiment illustrated in FIGS. 25-26, a user would rotate the rounded collar 520 so as to engage the threads 524 with complementary threads in the interior of the first conduit portion 192. The user would continue to rotate the rounded collar 520, thereby advancing the bladder 300 of the test plug 100 into the first conduit portion until such point as a first portion of the lower seal 550 (disposed on a bottom surface 505 of the seal carrier ring 510) engages a first portion of the edge 121 of the clean-out tee 120. Upon further rotation of the rounded collar 520, the seal carrier ring 510 will begin rotating and translating about the tapered surface 527 of the rounded collar 520 until such point as a substantial portion (up to and including as much as an entirety) of the lower seal 550 engages the edge 121 of the clean-out tee 120. Continued rotation of the rounded collar 520 by the user will cause the lower seal 550 to generate a force against the edge 121 to thereby cause a seal between the lower seal 550 and the edge 121.

The foregoing description of the preferred embodiments of the present invention has been presented for purposes of illustration and description. It is not intended to be exhaustive or to limit the invention to the precise form disclosed. Modifications or variations are possible in light of the above teachings. The pneumatic test plug for clean-out tees, the plumbing assembly, and the method of testing a pipeline in accordance with the present invention may include any combination or sub-combination of the features or concepts disclosed by the present application.

The embodiments were chosen and described to illustrate the principles of the invention and its practical application. It is clear that modifications and variations are within the scope of the invention as determined by the appended claims. The drawings and preferred embodiments do not and are not intended to limit the ordinary meaning of the claims in their fair and broad interpretation in any way.

What is claimed:

1. A pneumatic test plug for clean-out tees comprising:
   a cap having:
      an inflation inlet; and
      a testing fluid inlet providing a conduit for a testing fluid,
   a bladder in fluid connection with the inflation inlet having:
      an open end that receives air from the inflation inlet; and
      a closed end opposite the open end,
   wherein the conduit of the testing fluid inlet is configured to provide testing fluid through the cap, wherein the conduit of the testing fluid inlet is external to the bladder, wherein the conduit of the testing fluid inlet extends through the cap from a location outside of the cap to a location outside of the bladder, and
   wherein the inflation inlet provides a passageway to the bladder.

2. The pneumatic test plug of claim 1, wherein the testing fluid inlet is in fluid connection with a pipeline.

3. The pneumatic test plug of claim 1, wherein the cap further has at least one thumb wing.

4. The pneumatic test plug of claim 1, wherein the pneumatic test plug is seated in the clean-out tee.

5. The pneumatic test plug of claim 1, further comprising a retention collar connected to the cap and the bladder.

6. The pneumatic test plug of claim 5, wherein the cap further comprises an attachment feature positioned thereon, the attachment feature being connected to the retention collar.

7. A plumbing assembly comprising:
   a clean-out tee having:
      a first conduit portion;
      a second conduit portion;
      a third conduit portion; and
   a test plug positioned in the first conduit portion, the test plug having:
      a cap having:
         an inflation inlet; and
         a testing fluid inlet providing a conduit for a testing fluid;

a bladder in fluid connection with the inflation inlet having:
  an open end that receives air from the inflation inlet; and
  a closed end opposite the open end;
wherein the conduit of the testing fluid inlet is configured to provide testing fluid through the cap, wherein the conduit of the testing fluid inlet is external to the bladder, wherein the conduit of the testing fluid inlet extends through the cap from a location outside of the cap to a location outside of the bladder;
wherein the testing fluid inlet provides testing fluid to the second conduit portion; and
wherein the bladder seals against an interior surface of the clean-out tee when the bladder is inflated to prevent the testing fluid from passing from the second conduit portion to the third conduit portion.

8. The plumbing assemble of claim 7, wherein the second conduit portion and the third conduit portion are configured to connect to piping.

9. The plumbing assembly of claim 7, wherein the testing fluid inlet is in fluid connection with the second conduit.

10. The plumbing assembly of claim 7, wherein the cap further comprises exteriorly disposed threads for securing the cap to the first conduit in the clean-out tee.

11. A method of testing a pipeline, the method comprising:
  connecting a clean-out tee having a pneumatic test plug to the pipeline;
  wherein pneumatic test plug has a testing fluid inlet for receiving a testing fluid;
  wherein the testing fluid inlet provides a conduit that is in fluid connection with the pipeline;
  inflating a bladder in the pneumatic test plug until the bladder contacts and seals against a portion of the clean-out tee;
  adding the testing fluid to the testing fluid inlet until an upstream segment of the pipeline contains a desired amount of testing fluid, wherein the conduit of the testing fluid inlet is external to the bladder, wherein the conduit of the testing fluid inlet extends through the cap from a location outside of the cap to a location outside of the bladder;
  performing a test;
  at least partially deflating the bladder; and
  allowing the testing fluid to travel to a downstream segment of the pipeline past the bladder.

12. The method of claim 11, wherein the test is selected from the group consisting of a pressure test and a leakage test.

13. The method of claim 11, wherein the pneumatic test plug has a cap connected to the testing fluid inlet, the cap having a first cylindrical wall and wherein the inflation inlet is connected to the first cylindrical wall.

14. The method of claim 11, wherein the pneumatic test plug has a retention collar and a testing fluid outlet in the retention collar and wherein the testing fluid outlet and the testing fluid inlet are in fluid connection with the pipeline.

* * * * *